United States Patent
Tanaka et al.

(10) Patent No.: US 12,255,722 B2
(45) Date of Patent: Mar. 18, 2025

(54) COMMUNICATION DEVICE AND COMMUNICATION METHOD

(71) Applicant: SONY GROUP CORPORATION, Tokyo (JP)

(72) Inventors: Ken Tanaka, Tokyo (JP); Yusuke Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 452 days.

(21) Appl. No.: 17/631,529

(22) PCT Filed: Apr. 30, 2020

(86) PCT No.: PCT/JP2020/018268
§ 371 (c)(1),
(2) Date: Jan. 31, 2022

(87) PCT Pub. No.: WO2021/024559
PCT Pub. Date: Feb. 11, 2021

(65) Prior Publication Data
US 2022/0271820 A1 Aug. 25, 2022

(30) Foreign Application Priority Data

Aug. 7, 2019 (JP) ................. 2019-145746

(51) Int. Cl.
*H04B 7/08* (2006.01)
*H04B 7/0408* (2017.01)
*H04W 56/00* (2009.01)

(52) U.S. Cl.
CPC ........... *H04B 7/088* (2013.01); *H04B 7/0408* (2013.01); *H04W 56/005* (2013.01)

(58) Field of Classification Search
CPC .... H04B 7/088; H04B 7/0408; H04B 7/0623; H04B 7/0671; H04B 7/0695; H04B 1/123;
(Continued)

(56) References Cited

U.S. PATENT DOCUMENTS 6,463,048 B1 10/2002 Garyantes
7,340,281 B2 * 3/2008 Zeira ...................... H04B 7/088
455/562.1
(Continued)

FOREIGN PATENT DOCUMENTS

CA 2622706 A1 3/2007
CN 1565090 A 1/2005
(Continued)

OTHER PUBLICATIONS

Machine translation of Suzaki et al "Time delay compensation method by the interpolation signal generation between the antennas in distributed array antenna for broadband system", IEICE Technical Report, vol. 115, No. 287, Oct. 2015, pp. 57-62 (Year: 2015).*
(Continued)

*Primary Examiner* — Lana N Le
(74) *Attorney, Agent, or Firm* — CHIP LAW GROUP

(57) ABSTRACT

Provided is a communication device including a plurality of antenna elements and that performs wireless communication in a high frequency band while suppressing the circuit scale. The communication device includes: a communication unit that transmits and receives a wireless signal using a plurality of antenna elements; and a control unit that controls compensation for degradation in communication quality in the communication unit on the basis of control information received from outside. The communication unit includes a plurality of wireless interfaces and a delay compensation unit that compensates for delay of the wireless interfaces.

(Continued)

The control unit determines whether or not to perform the compensation on the basis of capability information exchanged with a communication partner.

9 Claims, 18 Drawing Sheets

(58) Field of Classification Search
CPC ........ H04B 1/40; H04B 7/086; H04B 17/309; H04B 7/0691; H04B 1/10; H04B 1/109; H04B 17/318; H04B 7/01; H04B 7/08; H04B 7/061; H04W 56/005; H04W 56/004; H04W 8/22; H04W 88/02; H04W 52/245; H04W 72/542; H04W 28/0236; H04W 36/30; H04W 36/302; H04W 52/241; H04W 56/0035; H04W 56/0045; H04W 56/0065

See application file for complete search history.

(56) References Cited

U.S. PATENT DOCUMENTS

| | | | | |
|---|---|---|---|---|
| 2004/0171352 | A1* | 9/2004 | Maeda | H04B 1/123 455/65 |
| 2004/0184515 | A1 | 9/2004 | Im | |
| 2005/0003763 | A1* | 1/2005 | Lastinger | H04B 7/0408 455/67.11 |
| 2007/0066299 | A1* | 3/2007 | Roy | H04B 7/0608 455/423 |
| 2011/0300818 | A1* | 12/2011 | Mirzaei | H04W 88/02 455/127.2 |
| 2012/0093258 | A1* | 4/2012 | Suh | H04B 7/0623 375/295 |
| 2012/0163321 | A1 | 6/2012 | Lee et al. | |
| 2020/0036413 | A1* | 1/2020 | Deutsch | H04B 7/0695 |

FOREIGN PATENT DOCUMENTS

| | | |
|---|---|---|
| CN | 101248693 A | 8/2008 |
| CN | 102484516 A | 5/2012 |
| EP | 1071222 A2 | 1/2001 |
| EP | 2448141 A2 | 5/2012 |
| JP | 2001-069041 A | 3/2001 |
| JP | 2002-190704 A | 7/2002 |
| JP | 2005-509354 A | 4/2005 |
| JP | 2009-509410 A | 3/2009 |
| JP | 2012-531801 A | 12/2012 |
| JP | 2017-041792 A | 2/2017 |
| KR | 10-2003-0033192 A | 5/2003 |
| KR | 10-2008-0022208 A | 3/2008 |
| KR | 10-2010-0138264 A | 12/2010 |
| KR | 10-2011-0023826 A | 3/2011 |
| WO | 2003/041291 A1 | 5/2003 |
| WO | 2007/035320 A1 | 3/2007 |
| WO | 2010/151068 A2 | 12/2010 |
| WO | 2011/025334 A2 | 3/2011 |

OTHER PUBLICATIONS

Extended European Search Report of EP Application No. 20849777.6, issued on Aug. 9, 2022, 10 pages.

International Search Report and Written Opinion of PCT Application No. PCT/JP2020/018268, issued on Aug. 11, 2020, 12 pages of ISRWO.

Suzaki, et al., "Time delay compensation method by the interpolation signal generation between the antennas in distributed array antenna for broadband system", IEICE Technical Report, vol. 115, No. 287, Oct. 2015, pp. 57-62.

Tanaka, et al., "Polynomial Regression of Sample Signal Variance Using Spatial-Wideband effect in Millimeter Waveband Large Capacity Transmission", Proceedings of the 2019 IEICE General Conference, Mar. 5, 2019, p. 272.

* cited by examiner

COMMUNICATION DEVICE AND COMMUNICATION METHOD

CROSS REFERENCE TO RELATED APPLICATIONS

This application is a U.S. National Phase of International Patent Application No. PCT/JP2020/018268 filed on Apr. 30, 2020, which claims priority benefit of Japanese Patent Application No. JP 2019-145746 filed in the Japan Patent Office on Aug. 7, 2019. Each of the above-referenced applications is hereby incorporated herein by reference in its entirety.

TECHNICAL FIELD

The technique disclosed in the present specification relates to a communication device provided with a plurality of antenna elements and that performs wireless communication in a high frequency band, as well as to a communication method.

BACKGROUND ART

In recent years, increasing complexity of wireless terminals and an increase in the variety of communication applications have led to the need to expand the capacity of communication with terminals. High frequency band communication, which can ensure a wide bandwidth, is attracting attention as a way of achieving an expansion in communication capacity. Spatial attenuation in high frequency bands is large, which makes it difficult to provide greater communication distances. As such, a method is employed in which spatial attenuation is compensated for by using an array antenna including many antenna elements to obtain high gain.

A phased array antenna provided with a phase shifter in each antenna element is typically used in order to suppress an increase in circuit scale caused by installing delay lines in all the antenna elements constituting the array antenna. High gain can be obtained through beam formation using the phase shifters. Hybrid beamforming, which combines digital signal processing with a phased array antenna, is being examined broadly, particularly in millimeter-wave bands such as 60 GHz.

In a phased array antenna, a complex phase difference of a signal caused by path length differences between receiving antennas or transmitting antennas is compensated for by the phase shifters and then composited to obtain a gain ("composite gain" hereinafter). At this time, it is assumed that the path length difference from the transmitting point to each receiving antenna element and from each transmitting antenna element to the receiving point is negligible with respect to the symbol length (period length) of the signal. However, in wideband communication, the symbol length of the signal becomes shorter and the antenna aperture length becomes non-negligible with respect to the symbol length. There is thus a problem in that it may not be possible to receive the same symbol between antenna elements, or even if the same symbol can be received, the amplitude may be different, resulting in degradation of the composite gain. Increasing the number of antenna elements to compensate for spatial attenuation as described above inevitably increases the antenna aperture length.

For example, a delay compensation method which compensates for delay in all antennas has been proposed in order to compensate for degradation caused by propagation delay in the case of extremely wide antenna intervals, assuming an application such as satellite communication (see PTL 1). However, this delay compensation method requires an ADC and a DAC for each antenna element. As described above, in the high frequency band, a single phased array antenna is equipped with a large number of antenna elements, and thus the circuit scale increases when the same number of DACs and ADCs as there are antenna elements are provided.

CITATION LIST

Patent Literature

[PTL 1]
JP 2017-41792 A

SUMMARY

Technical Problem

An object of the technique disclosed in the present specification is to provide a communication device including a plurality of antenna elements and that performs wireless communication in a high frequency band while suppressing the circuit scale, as well as a communication method.

Solution to Problem

The technique disclosed in the present specification has been achieved in light of the problems described above, and a first aspect thereof is a communication device including: a communication unit that transmits and receives a wireless signal using a plurality of antenna elements; and a control unit that controls compensation for degradation in communication quality in the communication unit on the basis of control information received from outside.

The control unit determines whether or not to perform the compensation on the basis of capability information exchanged with a communication partner.

The control information includes at least one of information pertaining to an antenna element used during data transmission with a communication partner and information pertaining to an arrival direction in which a receiving station of a data frame can receive. Additionally, the communication unit includes a plurality of wireless interfaces and a delay compensation unit that compensates for delay of the wireless interfaces. Furthermore, the control unit determines a compensation parameter including at least one of an antenna element, a frequency bandwidth, a phase adjustment amount of the wireless interfaces, and a delay compensation amount used in wireless communication with a communication partner, on the basis of the control information received from the communication partner.

Additionally, the control unit determines candidates for the compensation parameter on the basis of an arrival direction of a signal from the communication partner, and determines the compensation parameter from among the candidates on the basis of the control information.

In addition, a second aspect of the technique disclosed in the present specification is a communication method performed by a communication device that transmits and receives a wireless signal using a plurality of antenna elements, the method including: receiving control information from outside; and controlling compensation for degradation in communication quality in the communication unit on the basis of control information received from outside.

Advantageous Effects of Invention

According to the technique disclosed in the present specification, it is possible to provide a communication device and a communication method that exchange frames for the purpose of making a notification of a frequency bandwidth required to compensate for composite gain degradation, and arrival direction and delay compensation amount estimation.

Additionally, according to the technique disclosed in the present specification, it is possible to provide a communication device having an antenna configuration capable of dynamically selecting antennas for compositing and compensating for composite gain degradation by calculating delay between the selected antennas, as well as a communication method.

Note that the effects described in the present specification are merely examples, and the effects provided by the technique disclosed in the present specification are not limited thereto. In addition, the technique disclosed in the present specification may further provide additional effects aside from the aforementioned effects.

Other objects, features, and advantages of the technique disclosed in the present specification will become clear from detailed descriptions based on embodiments described below and the attached drawings.

DESCRIPTION OF EMBODIMENTS

Embodiments of the technique described in the present specification will be described hereinafter with reference to the drawings.

A. System Configuration

Figure 1:
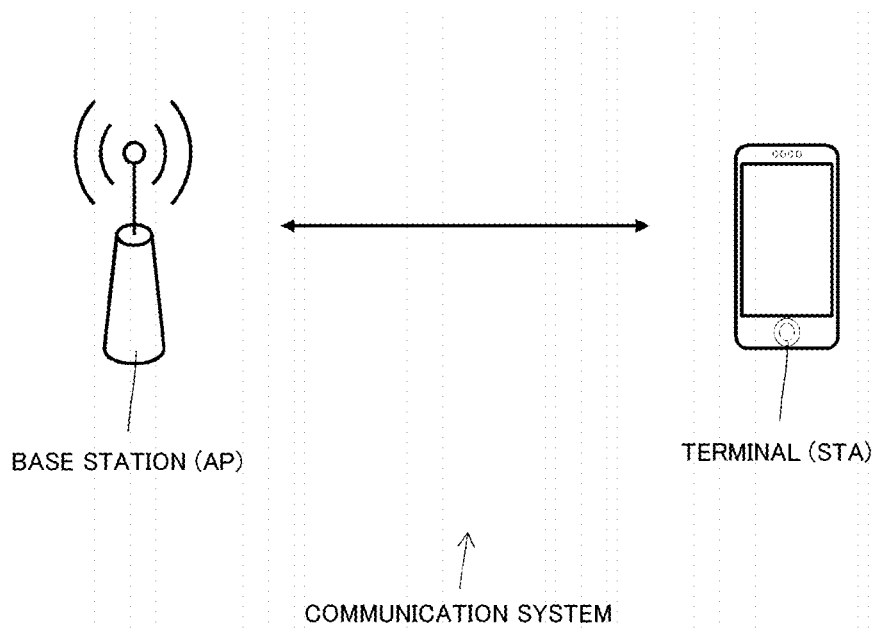
FIG. 1 is a diagram illustrating an example of the configuration of a communication system.

FIG. 1 schematically illustrates an example of a communication system in which the technique disclosed in the present specification is applied. The communication system illustrated here is constituted by a single base station (AP) and a terminal (STA) connected to the base station. Although illustrated in a simplified form in FIG. 1, the base station and the terminal both include a plurality of antenna elements. Then, within the communication system, wireless communication is performed between the base station and the terminals using wide bandwidth in a high frequency band such as the millimeter-wave band. In addition, a frame exchange is performed between the base station and the terminal for the purpose of making a notification of a frequency bandwidth required to compensate for composite gain degradation, and arrival direction and delay compensation amount estimation, the details of which will be described later. It is assumed that two or more terminals are connected to one base station, but only one is illustrated here to simplify the descriptions.

Figure 2:
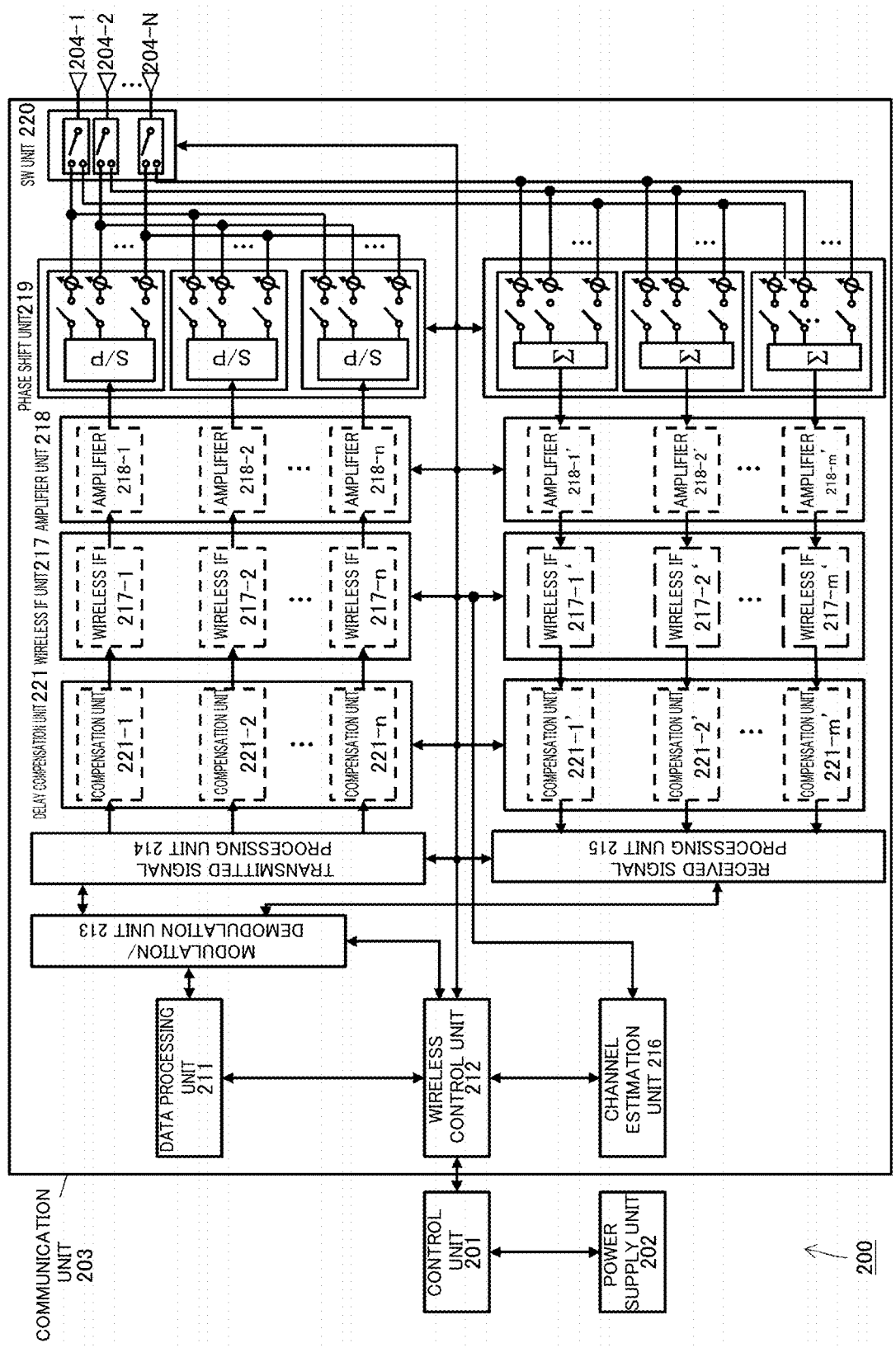
FIG. 2 is a diagram illustrating an example of the configuration of a communication device 200.

FIG. 2 is a diagram illustrating an example of the configuration of a communication device 200. This communication device 200 can operate as the base station or the terminal in the communication system illustrated in FIG. 1. The communication device 200 includes a control unit 201 that comprehensively controls the operations of the device as a whole, a power source unit 202 that supplies drive power to each unit, a communication unit 203 that performs wireless communication operations, and an antenna unit 204 that transmits and receives wireless signals on a propagation channel. The communication unit 203 is constituted by a data processing unit 211, a wireless control unit 212, a modulation/demodulation unit 213, a transmitted signal processing unit 214, a received signal processing unit 215, a channel estimation unit 216, a wireless interface (IF) unit 217, an amplifier unit 218, a phase shift unit 219, a switch (SW) unit 220, and a delay compensation unit 221.

The wireless interface unit 217 includes n wireless interfaces 217-1, . . . , 217-*n* on the transmitting side and n wireless interfaces 217-1', . . . , 217-*n*' on the receiving side. The amplifier unit 218 also includes n amplifiers 218-1, . . . , 218-*n* on the transmitting side and n amplifiers 218-1', . . . , 218-*n*' on the receiving side, corresponding to the wireless interface unit 217. Meanwhile, the antenna unit 204 is assumed to include a plurality of antenna elements. Each wireless interface in the wireless interface unit 217 is connected to a plurality of antennas via corresponding amplifiers in the amplifier unit 218 and corresponding phase shifters in the phase shift unit 219. Here, the amplifier unit 218 may have its functions incorporated into the wireless interface unit 217. The communication unit 210 may be implemented through LSI (large Scale Integration).

During transmission, when data is input from the upper layer of the communication protocol of the data processing unit 211 itself, the data processing unit 211 generates packets for wireless transmission from the data, performs processing such as adding headers for Media Access Control (MAC) and adding error detection code, and provides the processed data to the modulation/demodulation unit 213. During reception, the data processing unit 211 performs MAC header analysis, packet error detection, and reordering processing on the input data from the modulation/demodulation unit 213, and provides the processed data to the upper layer of the communication protocol of the data processing unit 211 itself.

The wireless control unit 212 passes information between the various units in the communication unit 203. The wireless control unit 212 also sets parameters in the modulation/demodulation unit 213, the transmitted signal processing unit 214, and the received signal processing unit 215; schedules packets in the data processing unit 211; sets parameters in the delay compensation unit 221, the phase shift unit 219, and the switch unit 220; and sets parameters in and controls the transmission power of the wireless interface unit 217 and the amplifier unit 218.

On the basis of results of frame exchange with a communication partner and the estimation of an arrival direction using a reference number transmitted by the communication partner, the wireless control unit 212 determines the antenna elements in the antenna unit 204 to be used in the wireless communication with the communication partner, determines a Steering Vector in the phase shift unit 219, determines a delay compensation amount in the delay compensation unit 221, and determines the frequency bandwidth to be used for transmitting and receiving wireless signals. In the present embodiment, the antenna elements used for wireless communication with the communication partner, the Steering Vector, the delay compensation amount, the frequency bandwidth, and the like are determined on the basis of capability information exchanged with the communication partner, a frame exchange sequence with the communication partner, a reference signal from the communication partner, and the like, details of which will be given later.

During transmission, the modulation/demodulation unit 213 performs processing such as encoding, interleaving, and modulation on the input data from the data processing unit 211 on the basis of a coding method and a modulation method set by the wireless control unit 212, generates a data symbol stream, and provides the stream to the transmitted signal processing unit 214. During reception, the modulation/demodulation unit 213 performs processing opposite from that performed during transmission, namely demodulation and deinterleaving, on the input from the received signal processing unit 215, and provides data to the data processing unit 211 or the control unit 201.

During transmission, the transmitted signal processing unit 214 performs signal processing provided for spatial separation on the input from the modulation/demodulation unit 213 as necessary, and provides one or more transmitted symbol streams which have been obtained to the wireless interfaces 217-1, . . . , 217-*n* within the wireless interface unit 217 through compensation units 221-1, . . . , 221-*n* within the delay compensation unit 221.

During reception, the received signal processing unit 215 performs signal processing on received symbol streams input from the respective wireless interfaces 217-1', . . . , 217-*n*' within the wireless interface unit 217 via the delay compensation unit 221, performs spatial separation on the stream as necessary, and provides the result to the modulation/demodulation unit 213.

The channel estimation unit 216 calculates complex channel information of the propagation channel using a preamble part and a training signal part of the input signals from the respective wireless interfaces 217-1', . . . , 217-*n*' in the wireless interface unit 217. The calculated complex channel information is used for demodulation processing in the modulation/demodulation unit 213 and spatial separation processing in the transmitted signal processing unit 214 and the received signal processing unit 215, via the wireless control unit 212.

The wireless interface unit 217 includes the n wireless interfaces 217-1, . . . , 217-*n* on the transmitting side and the n wireless interfaces 217-1', . . . , 217-*n*' on the receiving side. During transmission, the wireless interface unit 217 converts the input from the transmitted signal processing unit 214 to an analog signal, performs filtering, up-conversion to a carrier wave frequency, and phase control, and sends the signal to the antenna unit 204 or the amplifier unit 218. During reception, the wireless interface unit 217 performs processing opposite from that performed during transmission, namely phase control and down-conversion to a baseband frequency, on the input from the antenna unit 204 or the amplifier unit 218, and provides data to the received signal processing unit 215 and the channel estimation unit 216.

The amplifier unit 218 includes the n amplifiers 218-1, . . . , 218-*n* on the transmitting side and the n amplifiers 218-1', . . . , 218-*n*' on the receiving side. During transmission, the amplifier unit 218 amplifies the analog signals input from the wireless interfaces 217-1, . . . , 217-*n* in the wireless interface unit 217 to a predetermined power and sends the amplified signals to the phase shift unit 219. During reception, the amplifier unit 218 performs low-noise amplification of the n received signals input from the phase shift unit 219 to a predetermined power, and outputs the signals to the wireless interfaces 217-1', . . . , 217-*n*' in the wireless interface unit 218.

The amplifier unit 218 may have at least some of the functions on at least one of the transmitting side or the receiving side incorporated into the wireless interface unit 217. Additionally, at least some of the functions of the amplifier unit 218 on at least one of the transmitting side or the reception time may be constituent elements provided outside the communication unit 203.

The phase shift unit 219 includes a number of phase shifters corresponding to the number of antenna elements included in the antenna unit 204 (k in the example illustrated here), on each of the transmitting side and the receiving side, and applies phase adjustment (also called "Steering Vector" hereinafter) to each phase shifter connected to a corresponding antenna element according to determinations made by the wireless control unit 212.

During transmission, the phase shift unit 219 performs S/P (Serial-to-Parallel) conversion on the transmitted signals so that the signals can be sent in parallel to the antennas to which the signals are to be sent. After this, each phase shifter controls the complex phase according to each antenna element, and sends the signals to the switch unit 220. Instead of all the antenna elements connected as illustrated in FIG. 2, the antenna elements to which the signals are to be sent may be limited by providing a switching element inside the phase shift unit 219.

During reception, the phase shift unit 219 controls the complex phase of the signal input from each antenna element according to each antenna using the corresponding phase shifter, and furthermore composites a plurality of the received signals after phase control before sending the composited signals to the amplifier unit 218. As illustrated in FIG. 2, it is also possible to composite only the received signals from a limited number of the antenna elements, rather than compositing the input signals from all the antenna elements.

The switch unit 220 switches the circuit to which the antenna unit 204 is connected in accordance with the transmission and reception by the antenna elements in the antenna unit 204. However, the switch unit is not a necessary part of the embodiment, and a transmitting antenna and a receiving antenna may be provided independently.

The delay compensation unit 221 includes the n delay compensation units 221-1, ..., 221-n corresponding to respective ones of the n wireless interfaces 217-1, ..., 217-n on the transmitting side of the wireless interface unit 217, and furthermore includes m delay compensation units 221-1', ..., 222-m' corresponding to respective ones of m wireless interfaces 217-1', ..., 217-m' on the receiving side, and applies a delay compensation amount determined by the wireless control unit 212 for each of the wireless interfaces 217-1, ..., 217-n and the wireless interfaces 217-1', ..., 217-m' in the connected wireless interface unit 217. Each wireless interface in the wireless interface unit 217 is connected to a plurality of antennas via corresponding amplifiers in the amplifier unit 218 and corresponding phase shifters in the phase shift unit 219. Accordingly, it should be noted that the same delay compensation amount can be applied by the delay compensation unit 221 collectively to a plurality of antennas, rather than only to a single antenna at a time.

The control unit 201 controls the wireless control unit 212 and the power source unit 202. The control unit 201 may control at least some of the operations of the wireless control unit 212 instead of the wireless control unit 212.

The power source unit 202 is constituted by a battery power supply or a fixed power supply, and supplies power to the various units of the communication device 200.

B. Reception of Wireless Signal by Phased Array Antenna

Figure 3:
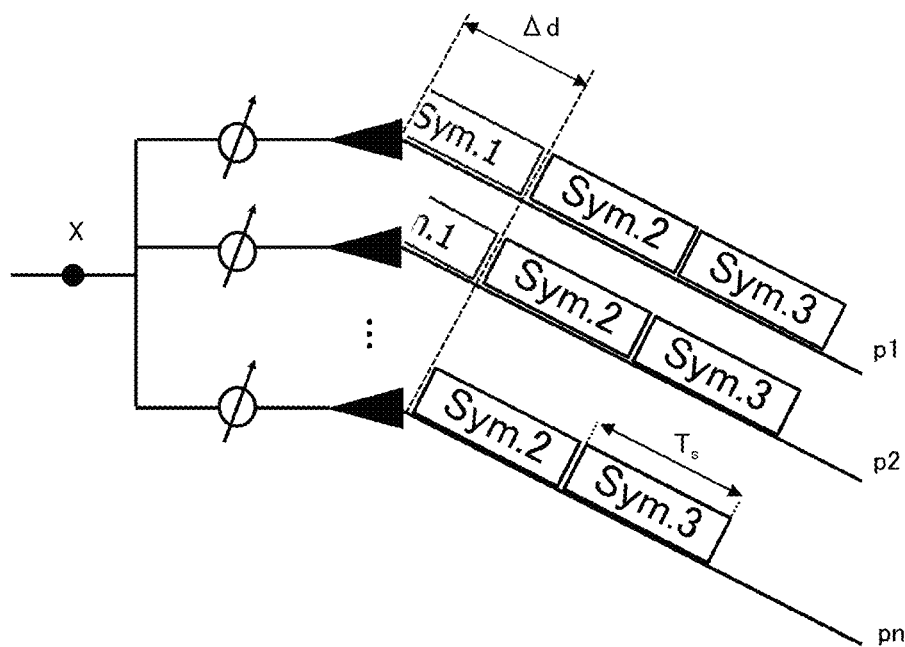
FIG. 3 is a diagram illustrating a difference between received signals of respective antennas in a phased array antenna.

FIG. 3 illustrates a difference between received signals of respective antennas in a phased array antenna. Additionally, FIG. 4 and FIG. 5 illustrate eye patterns of received signals in the phased array antenna (where the horizontal axis represents the time [symbol] and the vertical axis represents the signal level).

Generally, a phased array antenna receives signals at different arrival times between the transmitting antennas and the receiving antennas, depending on the distance between the antennas, the radiation direction of the transmitted signal, and the arrival direction of the received signal. FIG. 3 illustrates an example where a phased array antenna is used as the receiving antenna, resulting in a path length of $\Delta d$ between the antenna receiving at the shortest path (pn) and the antenna receiving at the longest path (p1).

Figure 4:
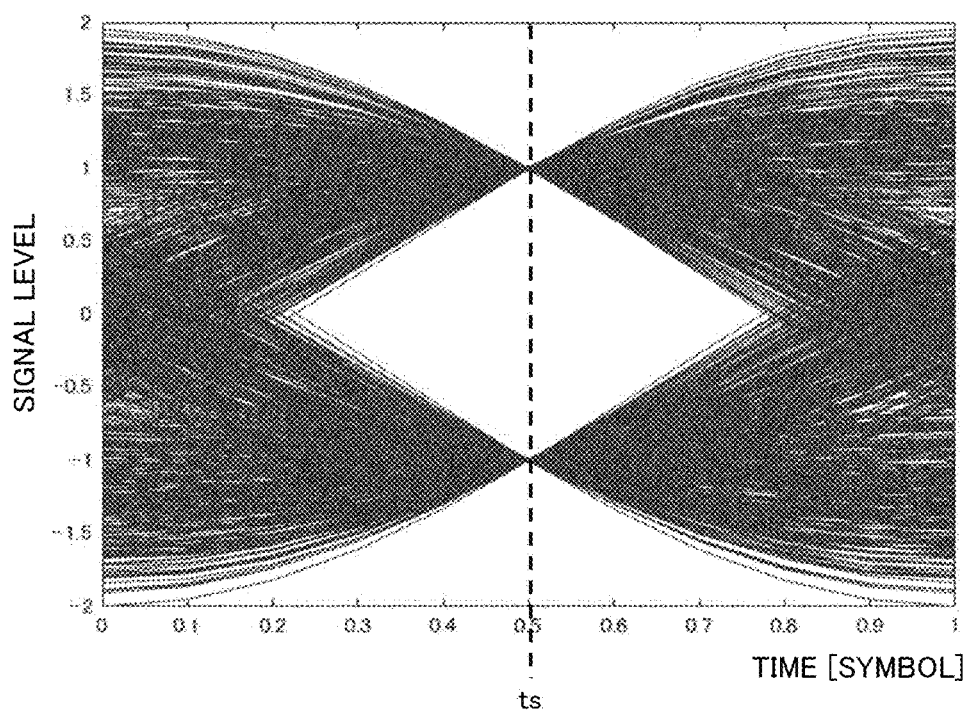
FIG. 4 is a diagram illustrating an eye pattern of a received signal in a phased array antenna (when the path lengths between antennas are negligible).

Here, assuming the symbol length of the received signal is T [sec] and the propagation speed is v [m/s], and if $\Delta d/v$ is a magnitude which is negligible with respect to T, a composited received signal observed at X will have an eye pattern having points with extremely low variance, as indicated by the received signal at time ts, illustrated in FIG. 4. This is because phase rotation caused by the path length difference between the antenna elements is compensated for by the phase shift unit 219, and received signals having the same waveform are composited.

Figure 5:
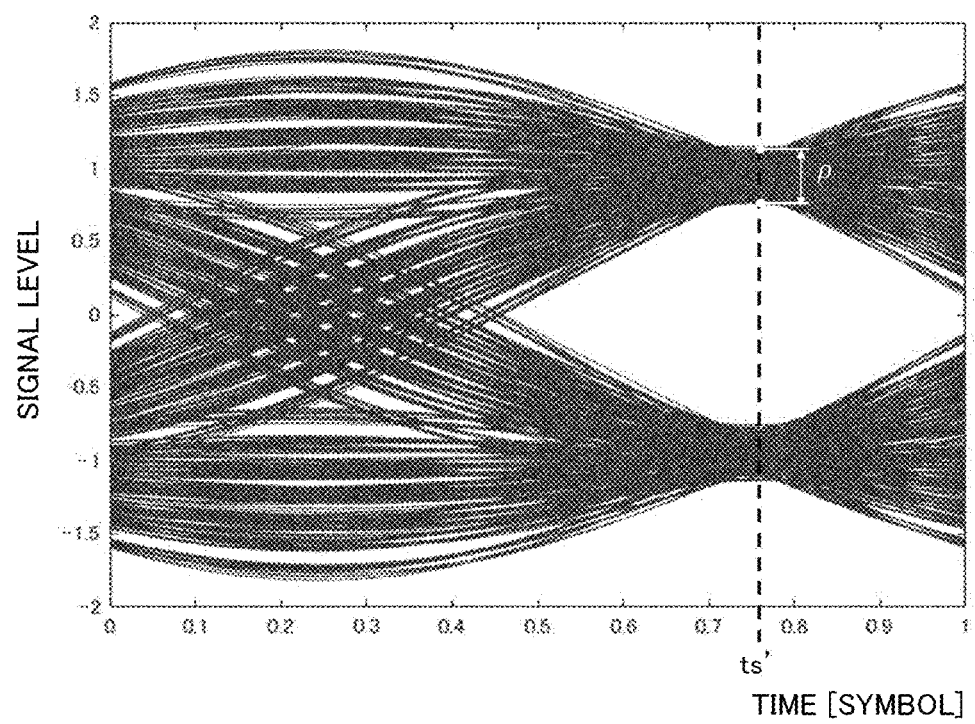
FIG. 5 is a diagram illustrating an eye pattern of a received signal in a phased array antenna (when the path lengths between antennas are not negligible).

On the other hand, if $\Delta d/v$ has a magnitude which is not negligible with respect to T, the composited received signal observed at X will have a variance p even at the time when the variance is the lowest (ts'), as illustrated in FIG. 5. The signal at this time can be a candidate for the point at which the analog signal received by the wireless interface unit 217 is converted to a digital signal.

The variance illustrated in FIG. 5 arises because although the complex phase difference of the received signals between the receiving antennas is compensated for by the phase shifters, after the compensation for the complex phase difference, received signals which have the same waveform but have different arrival times and different peak times are composited. Generally, when a delayed wave is observed, removing the CP (Cyclic Prefix) inserted in advance at the beginning of the received signal makes it possible to ensure the itineracy of the propagation matrix and eliminate interference between subcarriers through frequency equalization. However, it is extremely difficult to improve the SNR (Signal-to-Noise Ratio) in each subcarrier having degraded composite gain. It is therefore important to compensate for composite gain degradation arising in the phase shift unit 219. The amount of composite gain degradation differs depending on the bandwidth used for the communication, the arrival direction of the received signal which depends on each terminal, and the antenna aperture. It is therefore necessary to dynamically control the delay compensation amount in order to compensate for the degradation.

Three examples pertaining to the technique disclosed in the present specification will be described in order hereinafter. Note that the antennas, Steering Vector, delay compensation amount, and frequency bandwidth used in the wireless communication will be collectively referred to as "SWE (Spatial Wideband Effect) parameters".

First example: arrival direction is estimated by transmitting station and receiving station independently, and SWE parameters are determined.

Second example: arrival direction is estimated through the beamformer method, and SWE parameters are determined.

Third example: arrival direction is estimated using external information from sensors or the like, and SWE parameters are determined.

First Example

Figure 6:
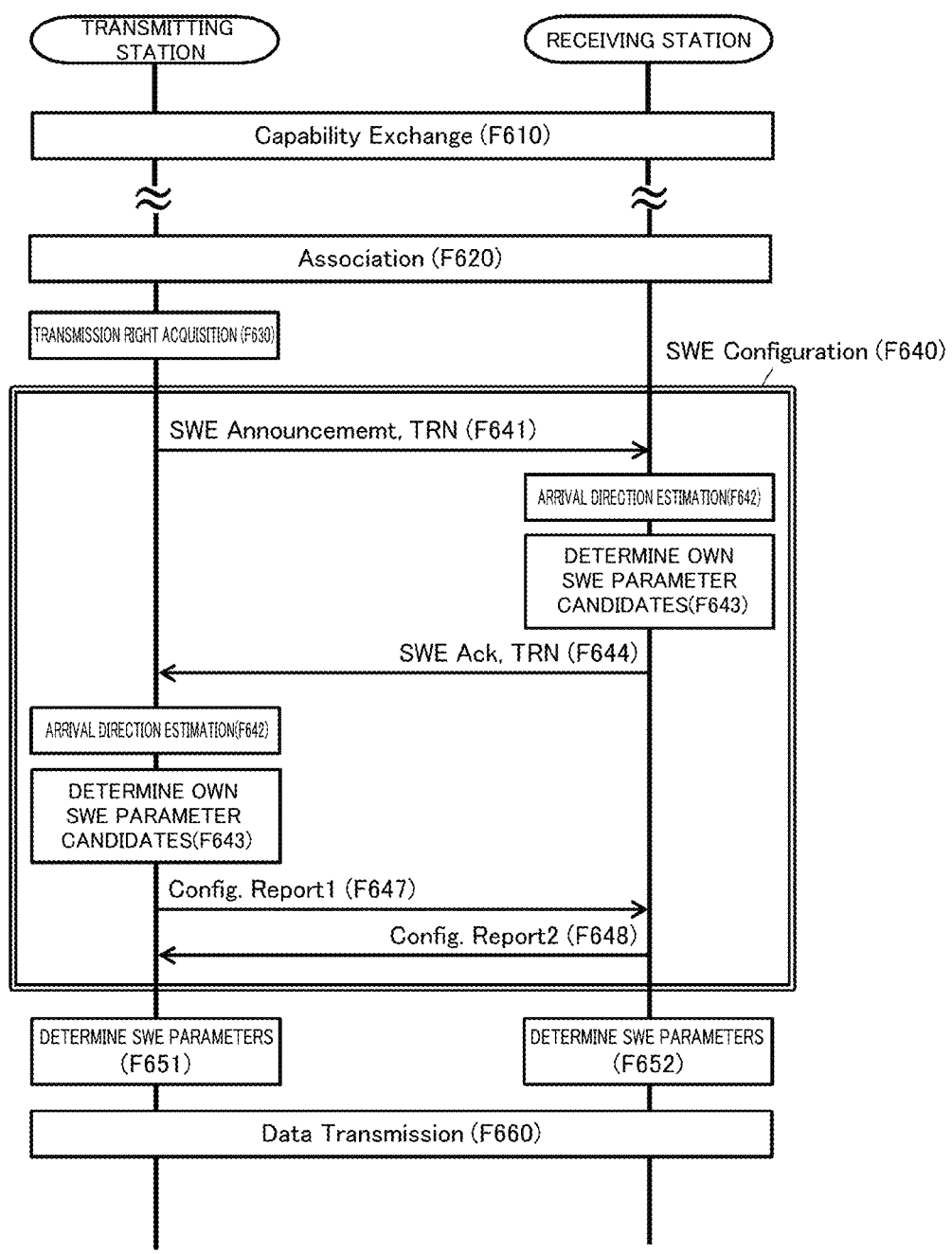
FIG. 6 is a diagram illustrating an example of a communication sequence performed between a transmitting station and a receiving station (a first example).

FIG. 6 illustrates an example of a communication sequence performed between the transmitting station and the receiving station in the first example. The "transmitting station" and "receiving station" referred to here are assumed to be one or the other of the base station and the terminal in the communication system illustrated in FIG. 1.

The communication sequence illustrated in FIG. 6 is constituted mainly by six phases: the exchange of capability information (Capability Exchange), Association, Transmission Right Acquisition, SWE Configuration, SWE Parameter Determination, and Data Transmission. However, the order in which the phases are implemented is not limited to the example illustrated in FIG. 6. For example, Capability Exchange may be performed after Association. The main features are in the signals transmitted and the operations of the transmitting station and the receiving station in each phase of the Capability Exchange and SWE Configuration, and this will be described in detail later.

The capability information exchange phase (F610) is a phase in which the transmitting station and the receiving station exchange the functions which they can perform themselves (also called "capability information" hereinafter). A feature of the present example is that the transmitting station and the receiving station are notified of the general bandwidth at which the composite gain degrades. The capability information and the frames used to exchange the capability information will be described in detail later.

Association (F620) is a phase that completes connection processing between the transmitting station and the receiving station. Association is based on, for example, the IEEE 802.11 standard, which is one of the representative standards for wireless LANs (Local Area Networks), and is performed by one of the transmitting station and the receiving station making an Association response to an Association request from the other.

Transmission Right Acquisition (F630) is a phase in which the transmitting station forms an agreement to transmit with the receiving station. For example, the transmitting station may acquire the transmission right in accordance with CSMA/CA (Carrier Sense Multiple Access with Collision Avoidance).

In the SWE Configuration phase (F640), prior to the implementation of Data Transmission, the transmitting station and the receiving station each performs a series of operations to obtain information necessary for determining the SWE parameters (i.e., SWE Configuration).

Upon acquiring the transmission right in the Transmission Right Acquisition phase (F630), the transmitting station notifies the receiving station of the start of the SWE Configuration phase (F640) by transmitting a SWE Announcement frame (F641). For example, on the basis of the information exchanged in the capability information exchange phase, the transmitting station transmits a SWE Announcement frame to initiate the SWE Configuration when the frequency bandwidth where composite gain degradation can occur in at least one of the transmitting station or the receiving stations is used in a later Data Transmission phase. The SWE Announcement frame contains information indicating the frequency bandwidth and MCS (Modulation and Coding Scheme) that can be used in the later Data Transmission phase, but the details thereof will be described later. Additionally, the transmitting station may transmit a training signal (TRN) after the SWE Announcement frame. Here, TRN is a reference signal that contains information for determining the SWE parameters, and may include, for example, a known series determined in advance by the transmitting station and the receiving station.

Upon receiving the SWE Announcement frame, the receiving station estimates the arrival direction using the TRN that follows the SWE Announcement frame when the receiving station determines that the communication quality is affected by the composite gain degradation (F642). Furthermore, the receiving station selects the receiving antennas in that receiving station itself, and determines the delay compensation amount as well as SWE parameter candidates such as the Steering Vector, the frequency bandwidth, and the like (F643).

After that, the receiving station returns a SWE Ack to the transmitting station as a reception response to the SWE Announcement frame and TRN (F644). The SWE Ack frame may contain information pertaining to some or all of the SWE parameters, such as the delay compensation amount, the Steering Vector, and the like determined by the receiving station. The receiving station may also transmit a TRN following the SWE Ack frame.

Upon receiving the SWE Ack frame from the receiving station, the transmitting station estimates the arrival direction using the TRN received following the SWE Ack frame if the transmitting station determines that the communication quality is affected by the composite gain degradation when the frequency bandwidth which can be used in a later Data Transmission phase is used (F645). Furthermore, the transmitting station selects the transmitting antennas in that transmitting station itself, and determines the delay compensation amount as well as SWE parameter candidates such as the Steering Vector, the frequency bandwidth, and the like (F646).

The transmitting station transmits the Config Report frame (Config Report 1) to the receiving station, including information for determining the SWE parameters (F647). For example, information indicating the antennas to be used by the transmitting station and the receiving station, and the frequency bandwidth to be used in the later Data Transmission phase, may be included in Config Report 1.

Upon receiving Config Report 1 from the transmitting station, the receiving station transmits a Config Report frame (Config Report 2) to the transmitting station as a response (F648). For example, if the receiving station can independently determine the antennas and SWE parameters of the transmitting station, the receiving station transmits information pertaining to the SWE parameters used by at least one of the transmitting station or the receiving station in the Data Transmission phase to the transmitting station in Config Report 2, on the basis of the received Config Report 1. Note that Config Report 2 does not necessarily need to be transmitted from the receiving station.

Next, the transmitting station determines the SWE parameters to be used in the Data Transmission phase on the basis of the SWE parameter candidates of the transmitting station itself determined in the SWE Configuration phase and Config Report 2 from the receiving station (F651). Likewise, the receiving station determines the SWE parameters to be used in the Data Transmission phase on the basis of the SWE parameter candidates of the receiving station itself determined in the SWE Configuration phase and Config Report 1 from the receiving station (F652).

Then, in the Data Transmission phase (F660), the transmitting station and the receiving station each performs wireless communication using the SWE parameters determined on the basis of the information obtained in the SWE Configuration phase (F640). However, the transmitting station and the receiving station do not have to use the antennas, Steering Vector, delay compensation amount, and frequency bandwidth determined through the SWE Configuration phase, and may, for example, perform wireless communication using values different from those in the SWE parameters for some periods of time. In the Data Transmission phase, for example, a data frame is transmitted from the transmitting station, and an Ack frame is returned from the receiving station in response in order to confirm the reception of the data frame, according to, for example, the IEEE 802.11 standard.

Note that the SWE Configuration does not have to be performed before the Data Transmission phase. In other words, the SWE Configuration may be omitted when it is determined that the communication quality will not be affected even if SWE parameters based on the SWE parameters determined in the previous SWE Configuration are used.

Likewise, one arrival direction estimation may be omitted, for one of the transmitting station and the receiving station, when it is determined that the communication quality will not be affected even if SWE parameters based on the SWE parameters determined in the previous SWE Configuration are used. In this case, the SWE Announcement or SWE Ack may contain information indicating that SWE parameters based on the SWE parameters determined in the previous SWE Configuration are used.

Figure 7:
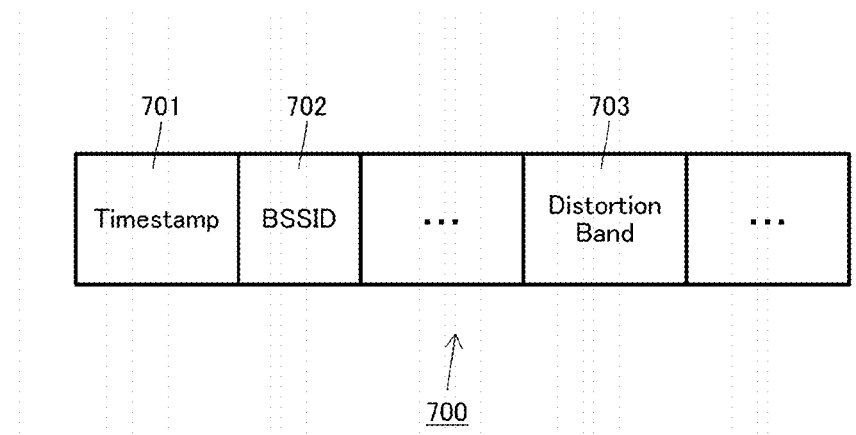
FIG. 7 is a diagram illustrating an example of the configuration of a capability information frame 700 (the first example).

FIG. 7 illustrates an example of the configuration of a capability information frame 700 exchanged between the transmitting station and the receiving station in the capability information exchange phase (F610).

A Timestamp field, indicated by reference number 701, holds information for a wireless communication terminal that has received the capability information frame 700 to synchronize its time with the wireless communication terminal that has transmitted the capability information frame 700.

A BSSID field, indicated by reference number 702, holds information indicating the connection state of the wireless communication terminal that transmitted the capability information with other wireless communication terminals (specifically, the identification information of the BSS (Basic Service Set) that the transmitting terminal is operating or connected to).

A Distortion Band field, indicated by reference number 703, holds information indicating a frequency bandwidth in which composite gain degradation can occur in the wireless communication terminal that transmitted the capability information frame 700. Note that information indicating parameters that can determine the frequency bandwidth in which composite gain degradation can occur, such as MCS, transmission direction, and reception direction, may be held in this field.

Figure 8:
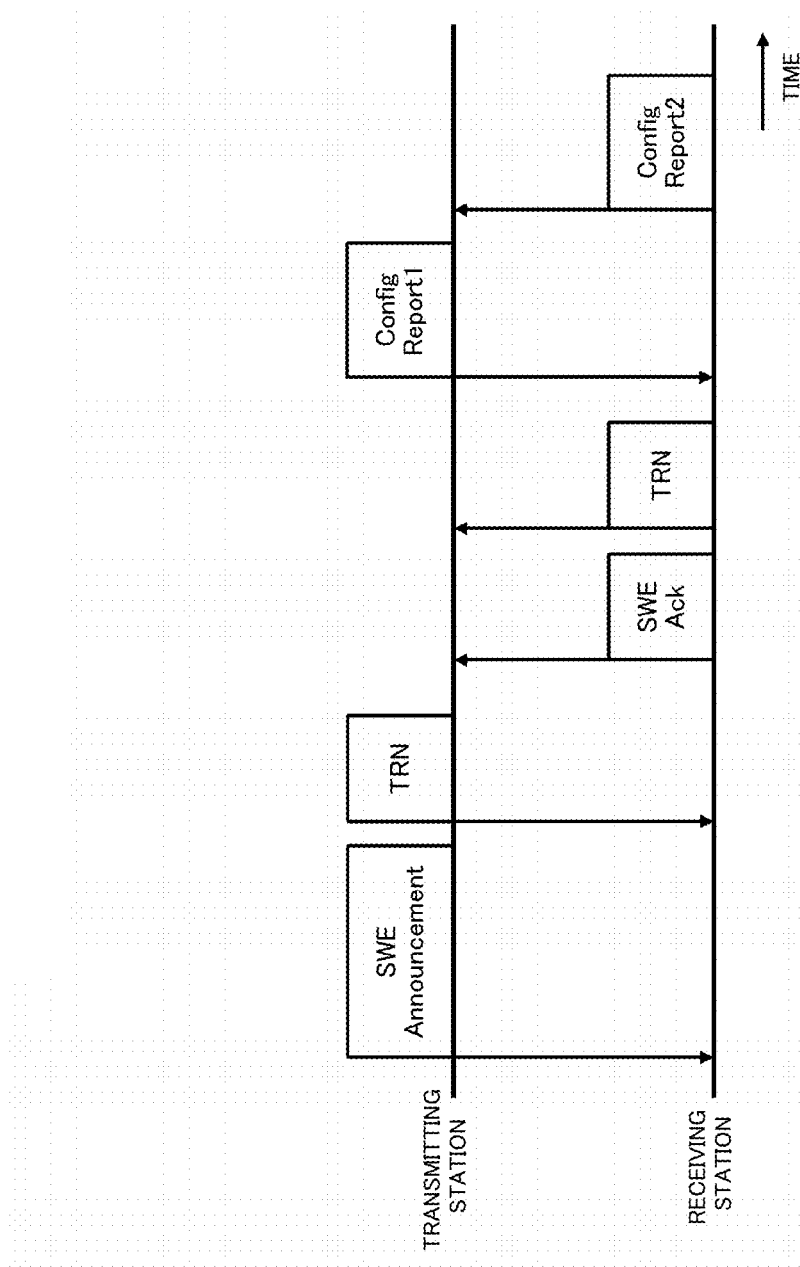
FIG. 8 is a diagram illustrating an example of a communication sequence performed in a SWE Configuration phase.

FIG. 8 illustrates an example of a detailed communication sequence performed between the transmitting station and the receiving station in the SWE Configuration phase. In this drawing, the horizontal axis is the time axis, and frames or signals transmitted by the transmitting station and the receiving station at each time are indicated by square boxes.

First, the transmitting station notifies the receiving station of the start of the SWE Configuration phase by transmitting the SWE Announcement frame. Following the SWE Announcement frame, the transmitting station sends a training signal (TRN), the TRN containing information for determining the SWE parameters. However, the transmitting station may transmit the SWE Announcement and the subsequent TRN as a single frame (described later).

On the other hand, the receiving station returns a SWE Ack to the transmitting station as a reception response to the SWE Announcement frame and TRN. The receiving station also transmits a TRN following the SWE Ack frame. However, the receiving station may transmit the SWE Ack and the subsequent TRN as a single frame.

When the transmitting station estimates the arrival direction using the TRN received following the SWE Ack frame and determines the SWE parameter candidates, the transmitting station transmits, to the receiving station, a Config Report frame (Config Report 1) containing information for determining the SWE parameters.

Additionally, upon receiving Config Report 1 from the transmitting station, the receiving station transmits a Config Report frame (Config Report 2) to the transmitting station as a response.

However, the transmitting station and the receiving station do not necessarily have to implement the transmission of Config Report.

Figure 9:
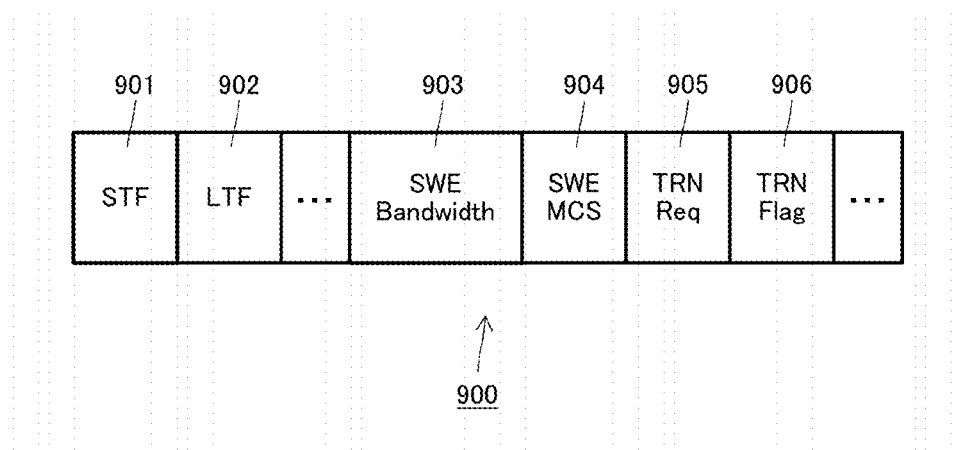
FIG. 9 is a diagram illustrating an example of the configuration of a SWE Announcement frame 900.

FIG. 9 illustrates an example of the structure of a SWE Announcement frame 900 for notifying the receiving station of the start of the SWE Configuration phase.

A STF (Short Training Field) field, indicated by reference number 901, holds information used as a reference signal for time synchronization and frequency synchronization in the wireless communication terminal that has received this SWE Announcement frame 900 (e.g., a known short signal series).

A LTF (Long Training Filed) field, indicated by reference number 902, holds information for estimating the received signal quality in the wireless communication terminal that has received this SWE Announcement frame 900 (e.g., a known long signal series). The LTF field 902 may also hold information used as a reference signal for time synchronization and frequency synchronization.

A SWE Bandwidth field, indicated by reference number 903, holds information indicating the frequency bandwidth that can be used in the subsequent Data Transmission phase, and information indicating that the frame 900 is a SWE Announcement frame.

A SWE MCS field, indicated by reference number 904, holds information indicating an MCS that can be used in the subsequent Data Transmission phase.

A TRN Flag field, indicated by reference number 906, holds information pertaining to the TRN frame transmitted after the SWE Announcement frame 900. For example, the length of the TRN frame and a repetition period of the TRN field may be held in this TRN Flag field 906. If no TRN frame is transmitted after the SWE Announcement frame 900, information indicating that no TRN frame is transmitted after is held in the TRN Flag field 906.

A TRN Req field, indicated by reference number 905, holds information for determining whether a subsequent TRN frame should be transmitted when the wireless communication terminal that has received the SWE Announcement frame 900 transmits the SWE Ack frame. For example, if the frequency bandwidth held in a Distortion Band field within the capability information frame of the transmitting station (see FIG. 7) is greater than the frequency bandwidth held in the SWE Bandwidth field 903 described above, information indicating that the TRN will not be transmitted following the transmission of the SWE Ack frame may be included.

Figure 10:
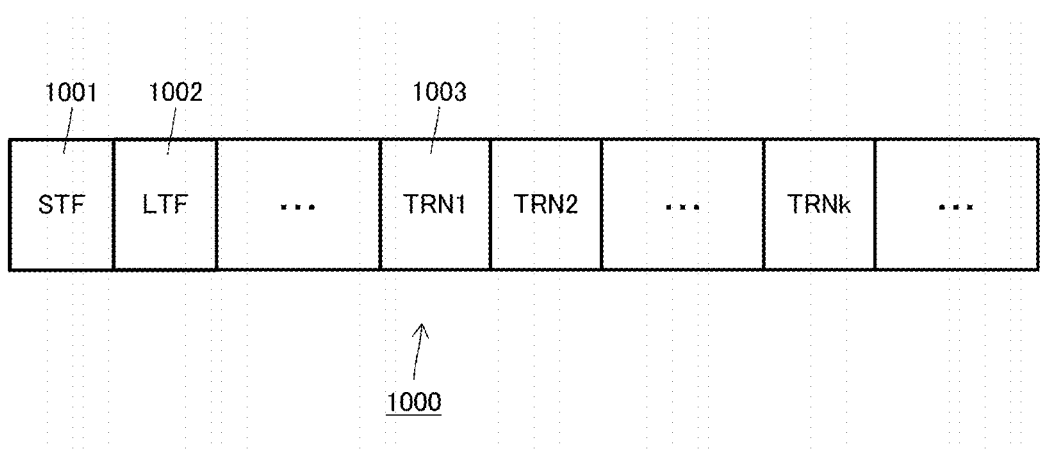
FIG. 10 is a diagram illustrating an example of the configuration of a TRN frame 1000.

FIG. 10 illustrates an example of the configuration of a TRN frame 1000, which is used in the SWE Configuration phase.

STF and LTF fields, indicated by reference numbers 1001 and 1002, respectively, are the same as the fields with the same names in the SWE Announcement frame (see FIG. 9) and will therefore not be described here.

Each of the TRN fields including a total of k TRNs (TRN1, TRN2, . . . , TRNk), starting with TRN1 indicated by reference number 1003, holds information indicating that the frame 1000 is a TRN frame, and information for performing arrival direction estimation at the wireless communication terminal that receives the TRN frame 1000. For example, a known series determined in advance between the transmitting station and the receiving station, and information for adjusting the gain when receiving the TRN frame 1000, may be held in each TRN field. Additionally, some of the TRN fields among TRN1, TRN2, . . . , TRNk may hold exactly the same information to improve the accuracy of the arrival direction estimation.

Figure 11:
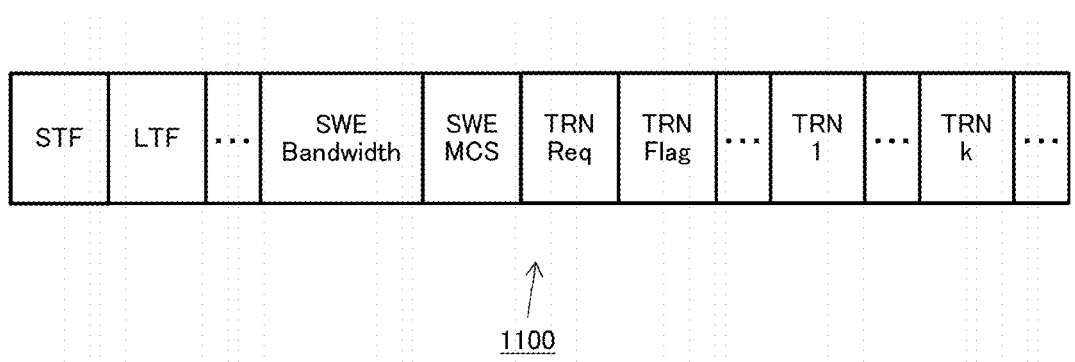
FIG. 11 is a diagram illustrating an example of the configuration of a frame 1100, which combines a SWE Announcement frame with a TRN frame into a single frame.

FIG. 11 illustrates an example of the configuration of a frame 1100, which combines a SWE Announcement frame with a TRN frame into a single frame. Each field in the frame 1100 is the same as the field having the same name in the SWE Announcement frame and the TRN frame, and will therefore not be described in detail here. However, in addition to that described above, the TRN Flag field may also hold information indicating that the frame 1100 is a frame in which the SWE Announcement frame and the TRN frame are combined into a single frame.

Figure 12:
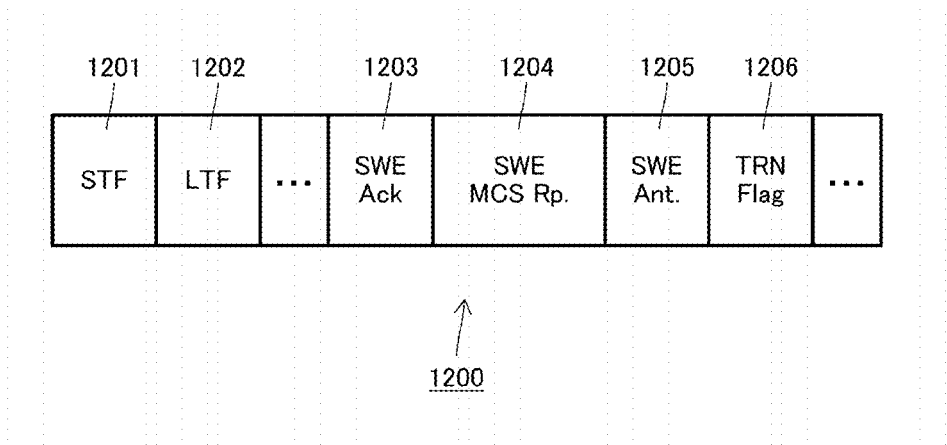
FIG. 12 is a diagram illustrating an example of the configuration of a SWE Ack frame 1200.

FIG. 12 illustrates an example of the configuration of a SWE Ack frame 1200, which is used as a confirmation response to the SWE Announcement frame 900 or 1100 in the SWE Configuration phase.

STF and LTF fields, indicated by reference numbers 1201 and 1202, respectively, are the same as the fields with the same names in the SWE Announcement frame (see FIG. 9) and will therefore not be described here.

A SWE Ack field, indicated by reference number 1203, includes information indicating that the frame 1200 is a SWE Ack frame. This SWE Ack field may hold information indicating that the SWE Announcement frame has been received correctly, for example.

A SWE MCS Rp. field, indicated by reference number 1204, includes information for determining the MCS used in the subsequent Data Transmission phase. For example, information indicating a composite gain degradation amount, an SNR, and so on when receiving a wireless signal according to the arrival direction estimated by the receiving station may be included.

A SWE Ant. field, indicated by reference number 1205, includes information pertaining to the antenna used in the Data Transmission phase by the wireless communication terminal (the receiving station) that transmitted the SWE Ack frame. For example, information indicating the number of antennas used by the receiving station in the Data Transmission phase, as well as candidates for the Steering Vector, the delay compensation amount, and the frequency bandwidth, may be held in the SWE Ant. field 1205. The information held in the SWE Ant. field 1205 may be information determined on the basis of the reception result of at least one of the SWE Announcement frame, the TRN frame, of a frame combining the SWE Announcement and the TRN into a single frame, received by the receiving station immediately previous.

A TRN Flag field, indicated by reference number 1206, holds information pertaining to the TRN frame transmitted after the SWE Ack frame 1200. For example, the length of the TRN frame and a repetition period of the TRN field may be held in this TRN Flag field 1206. If no TRN frame is transmitted after the SWE Ack frame, information indicating that no TRN frame is transmitted after the SWE Ack frame is held in the TRN Flag field 1206.

Figure 13:
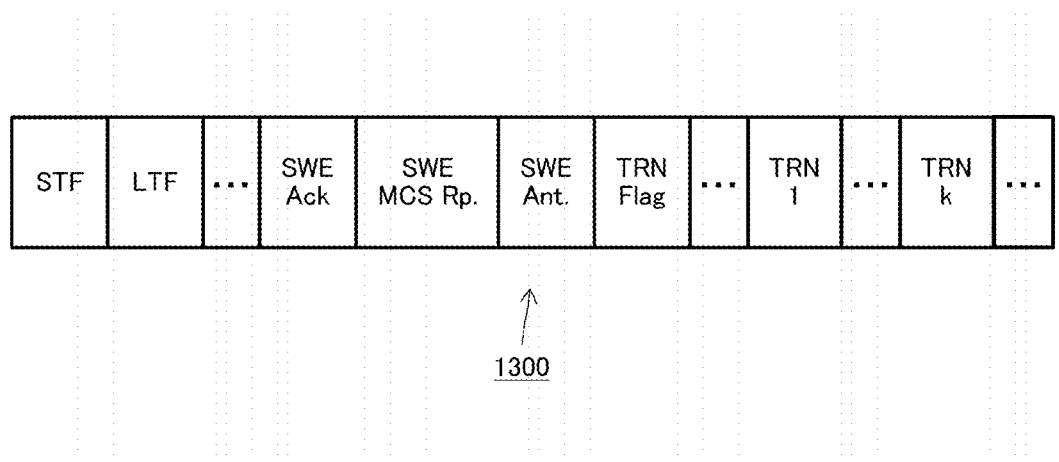
FIG. 13 is a diagram illustrating an example of the configuration of a frame 1300, which combines a SWE Ack frame with a TRN frame into a single frame.

FIG. 13 illustrates an example of the configuration of a frame 1300, which combines a SWE Ack frame with a TRN frame into a single frame. Each field in the frame 1300 is the same as the field having the same name in the SWE Ack frame and the TRN frame, and will therefore not be described in detail here. However, in addition to that described above, the TRN Flag field may also hold information indicating that the frame 1300 is a frame in which the SWE Ack frame and the TRN frame are combined into a single frame.

Figure 14:
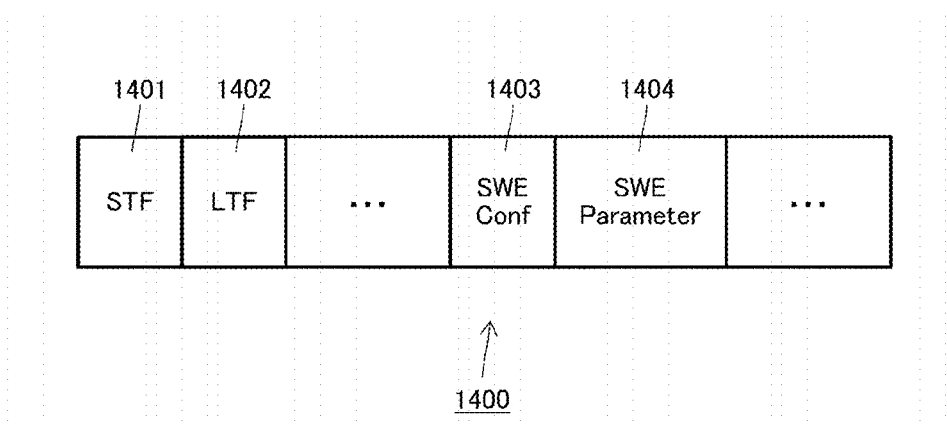
FIG. 14 is a diagram illustrating an example of the configuration of a Config Report frame 1400.

FIG. 14 illustrates an example of the configuration of a Config Report frame 1400, which is used in the SWE Configuration phase. The Config Report frame 1400 is used for Config Report 1 and Config Report 2.

STF and LTF fields, indicated by reference numbers 1401 and 1402, respectively, are the same as the fields with the same names in the frames described above and will therefore not be described here.

A SWE Conf field, indicated by reference number 1403, holds information indicating that the frame 1400 is a Config Report frame. If a Config Report frame has been received from the destination wireless communication terminal immediately before the Config Report frame 1400 is transmitted, information indicating that the communication partner has already received the Config Report frame may be held in the SWE Config field 1403.

A SWE Parameter field, indicated by reference number 1404, includes information required to determine the SWE parameters used in the subsequent Data Transmission phase. For example, information indicating the antennas (or number of antenna elements) used by the transmitting station and the receiving station in the Data Transmission phase, and the arrival direction at which the receiving station can receive, may be held in the SWE Parameter field 1404.

Figure 15:
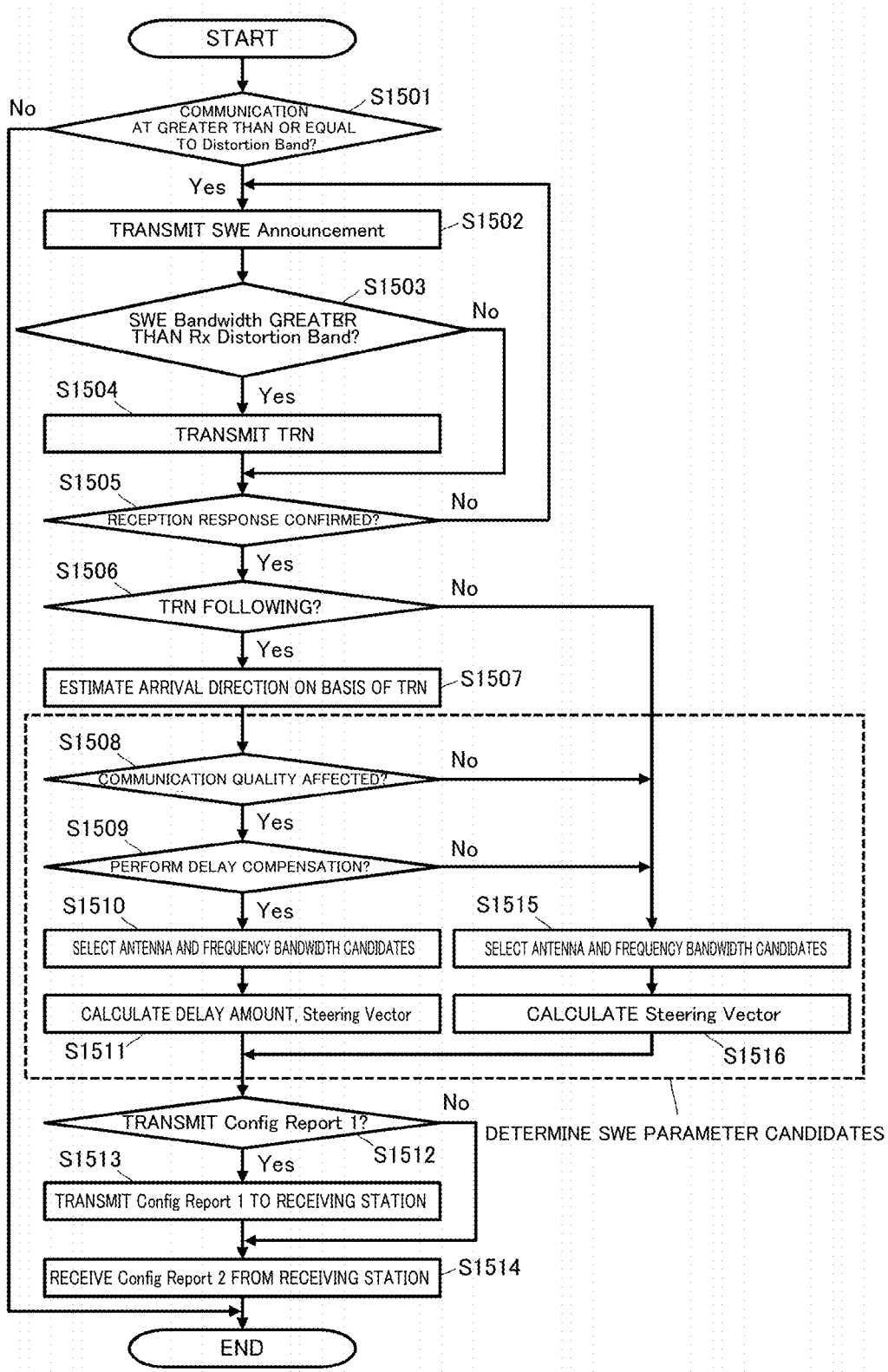
FIG. 15 is a flowchart illustrating operations performed by the transmitting station in the SWE Configuration phase (the first example).

FIG. 15 illustrates operations performed by the transmitting station in the SWE Configuration phase in the form of a flowchart. The operations illustrated here are assumed to be carried out by the communication device 200 operating as the transmitting station, under the control of the control unit 201.

The transmitting station compares a frequency bandwidth in which composite gain degradation can occur (Distortion Band) in the transmitting station and the receiving station with the frequency bandwidth that can be used in the Data Transmission phase, and determines whether to perform the SWE Configuration phase (step S1501).

If the frequency bandwidth that can be used in the Data Transmission phase is less than the frequency bandwidth in which composite gain degradation can occur in the transmitting station and the receiving station (No in step S1501), the transmitting station does not need to determine the SWE parameters, and therefore determines not to perform the SWE Configuration phase. Then, when the SWE Configuration phase is not to be performed (No in step S1501), the transmitting station skips all the subsequent processing steps, and ends this processing.

However, if the frequency bandwidth that can be used in the Data Transmission phase is greater than or equal to the frequency bandwidth in which composite gain degradation can occur in the transmitting station and the receiving station, the transmitting station determines to perform the SWE Configuration phase in order to determine the SWE parameters. In this case, (Yes in step S1501), the transmitting station transmits the SWE Announcement frame to the receiving station (step S1502).

Next, the transmitting station compares the frequency bandwidth which can be used in the Data Transmission phase (SWE Bandwidth) with the frequency bandwidth in which composite gain degradation can occur in the receiving station (Distortion Band) (step S1503).

If the frequency bandwidth which can be used in the Data Transmission phase exceeds the frequency bandwidth in which composite gain degradation can occur in the receiving station (Yes in step S1503), the transmitting station transmits the TRN frame after the SWE Announcement frame (step S1504). Alternatively, the transmitting station may transmit the SWE Announcement and the TRN together as a single frame (see FIG. 11).

Then, upon successfully confirming a reception response to the SWE Announcement frame through the SWE Ack frame received from the receiving station (Yes in step S1505), the transmitting station checks whether or not the TRN Flag field of that SWE Ack frame indicates that a TRN frame follows (step S1506).

If a TRN frame follows (Yes in step S1506), the transmitting station receives the following TRN frame and estimates the arrival direction (step S1507). Then, on the basis of the arrival direction estimation result, the transmitting station estimates the composite gain degradation amount from the candidate of the direction in which the transmitting station can transmit in the Data Transmission phase, the frequency bandwidth, and the number of antennas, and checks whether or not a desired signal quality can be obtained, i.e., whether the communication quality is affected by the composite gain degradation (step S1508).

If it is determined that the communication quality will be affected by the composite gain degradation (Yes in step S1508), the transmitting station further checks whether or not to perform delay compensation for the delay compensation unit 221 (step S1509).

If it is determined that delay compensation is to be performed (Yes in step S1509), the transmitting station performs delay compensation and then selects candidates for the antenna and the frequency bandwidth to be used in the communication (step S1510), and determines a delay compensation amount for the selected antenna and a Steering Vector to be applied to the phase shift unit 219 (step S1511). Although the antenna and frequency bandwidth candidates and the Steering Vector are determined after determining whether or not to perform delay compensation in FIG. 15, these items may be determined in a different order. Additionally, there may be a plurality of candidates for the direction in which the transmitting station can transmit.

On the other hand, if no TRN frame follows after the SWE Ack frame (No in step S1506), if the communication quality will not be affected by the composite gain degradation (No in step S1508), or if the communication quality will be affected by the composite gain degradation but it is determined that delay compensation is not to be performed (No in step S1509), the transmitting station selects candidates for the antenna and the frequency bandwidth to be used in the communication without performing delay compensation (step S1515), and determines the delay compensation amount for the selected antenna and the Steering Vector to be applied to the phase shift unit 219 (step S1516).

Then, the transmitting station determines whether or not to transmit a Config Report frame (Config Report 1) to the receiving station (step S1512). If it is determined that the Config Report frame is to be transmitted (Yes in step S1512), the transmitting station transmits the Config Report frame (Config Report 1) to the receiving station (step S1513). The transmitting station also receives a Config Report frame (Config Report 2) from the receiving station (step S1514).

Note that when transmitting Config Report 1 to the receiving station, the transmitting station may apply the Steering Vector for the phase shift unit 219 and the delay compensation for the delay compensation unit 221 on the basis of the Steering Vector and the delay compensation amount determined to be used in the Data Transmission phase.

Figure 16:
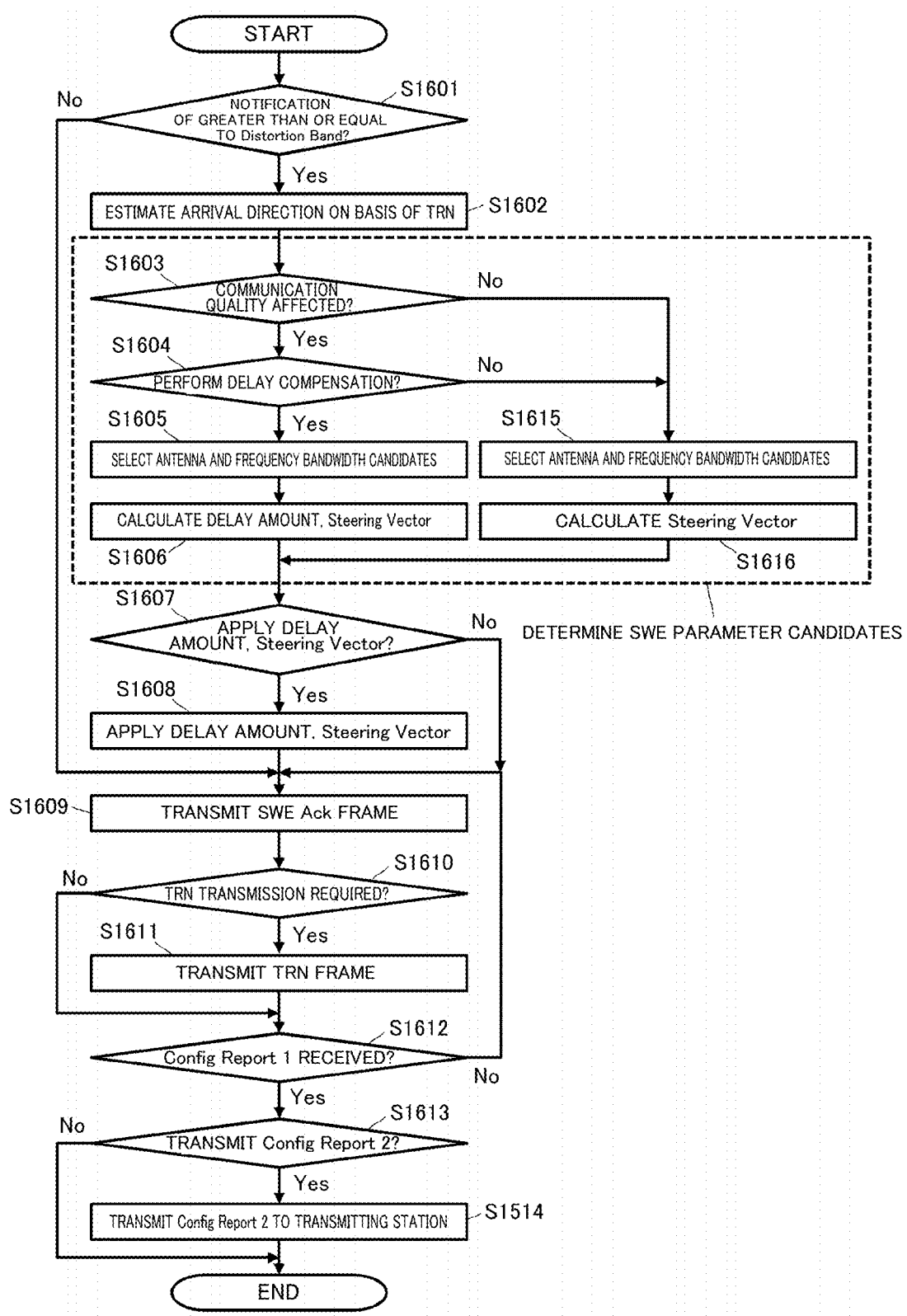
FIG. 16 is a flowchart illustrating operations performed by the receiving station in the SWE Configuration phase (the first example).

FIG. 16 illustrates operations performed by the receiving station in the SWE Configuration phase in the form of a flowchart. It is assumed that the receiving station starts the operations illustrated here in response to the SWE Announcement frame being received from the transmitting station. Additionally, the operations illustrated here are assumed to be carried out by the communication device 200 operating as the receiving station, under the control of the control unit 201.

First, the receiving station checks whether or not the frequency bandwidth which can be used in the Data Transmission phase and communicated by the SWE Announcement frame (SWE Bandwidth) is greater than or equal to the frequency bandwidth in which composite gain degradation can occur in the receiving station itself (Distortion Band) (step S1601).

If the frequency bandwidth which can be used in the Data Transmission phase is less than the frequency bandwidth in which composite gain degradation can occur in the receiving station itself (Yes in step S1601), the receiving station determines that the communication quality will be affected by composite gain degradation. The receiving station then estimates the arrival direction on the basis of the TRN frame received following the SWE Announcement frame (step S1602).

Next, on the basis of the arrival direction estimation result, the receiving station estimates the composite gain degradation amount from the candidate of the direction in which the receiving station can receive in the Data Transmission phase, the frequency bandwidth, and the number of antennas, and checks whether or not a desired signal quality can be obtained, i.e., whether the communication quality is affected by the composite gain degradation (step S1603).

If it is determined that the communication quality will be affected by the composite gain degradation (Yes in step S1603), the receiving station further checks whether or not to perform delay compensation for the delay compensation unit 221 (step S1604).

If it is determined that delay compensation is to be performed (Yes in step S1604), the receiving station performs delay compensation and then selects candidates for the antenna and the frequency bandwidth to be used in the communication (step S1605), and determines a delay compensation amount for the selected antenna and a Steering Vector to be applied to the phase shift unit 219 (step S1606). Although the antenna and frequency bandwidth candidates and the Steering Vector are determined after determining whether or not to perform delay compensation in FIG. 16, these items may be determined in a different order. Additionally, there may be a plurality of candidates for the direction in which the receiving station can receive.

On the other hand, if the communication quality will not be affected by the composite gain degradation (No in step S1603), or if the communication quality will be affected by the composite gain degradation but it is determined that delay compensation is not to be performed (No in step S1604), the receiving station selects candidates for the antenna and the frequency bandwidth to be used in the communication without performing delay compensation (step S1615), and determines the delay compensation amount for the selected antenna and the Steering Vector to be applied to the phase shift unit 219 (step S1616).

Next, the receiving station checks whether or not to use the delay compensation amount and the Steering Vector determined in step S1606 or S1615 as those to be used in the Data Transmission phase when returning the SWE Ack frame (step S1607). For example, when there are a plurality of paths for arriving signals from the transmitting station and the like, being omni-directional is sufficient, and thus it is not necessary to use the delay compensation amount and the Steering Vector.

Then, when the delay compensation amount and the Steering Vector used in the Data Transmission phase are also to be used when returning the SWE Ack frame (Yes in step S1607), the receiving station applies that delay compensation amount and Steering Vector to the delay compensation unit 221 and the phase shift unit 219 (step S1608)

Next, the receiving station returns the SWE Ack frame to the transmitting station having applied or not applied the delay compensation amount and the Steering Vector to be used in the Data Transmission phase (step S1609). Additionally, even if it has been determined that the communication quality will not be affected by the composite gain degradation (No in step S1601), the receiving station returns the SWE Ack frame to the transmitting station having not applied the delay compensation amount and the Steering Vector to be used in the Data Transmission phase (step S1609).

Next, the receiving station refers to a TRN Req field in the received SWE Announcement frame, and checks whether or not it is necessary to transmit a TRN frame following the SWE Ack frame (step S1610). If it is necessary to transmit a TRN (Yes in step S1610), the receiving station transmits the TRN frame following the SWE Ack frame (step S1611). However, the receiving station may transmit the SWE Ack frame and the TRN frame together as a single frame.

Next, the receiving station checks whether or not the Config Report frame (Config Report 1) has been received from the transmitting station (step S1612). If Config Report 1 has not been received from the transmitting station (No in step S1612), the receiving station returns to step S1609 and repeats the transmission of the SWE Ack frame. Although not illustrated in FIG. 16, this processing may be forcibly interrupted when the number of repetitions exceeds a certain number.

Next, upon receiving Config Report 1 from the transmitting station (Yes in step S1612), the receiving station checks whether or not to transmit the Config Report frame (Config Report 2) to the transmitting station (step S1613).

Then, if it is determined that Config Report 2 is to be transmitted (Yes in step S1613), the receiving station transmits Config Report 2 to the transmitting station (step S1614), and then ends this processing. Alternatively, if it is determined that Config Report 2 is not to be transmitted (No in step S1613), the receiving station ends this processing without transmitting Config Report 2 to the transmitting station.

According to the first example, through the SWE Configuration phase, the transmitting station and the receiving station appropriately determine both the delay compensation amount set in the delay compensation unit 221 and the Steering Vector set in the phase shift unit 219, for composite gain degradation in an array antenna caused by path length differences. Accordingly, composite gain degradation compensation can be implemented without compensating for a delay amount in all of the antennas.

Second Example

Figure 17:
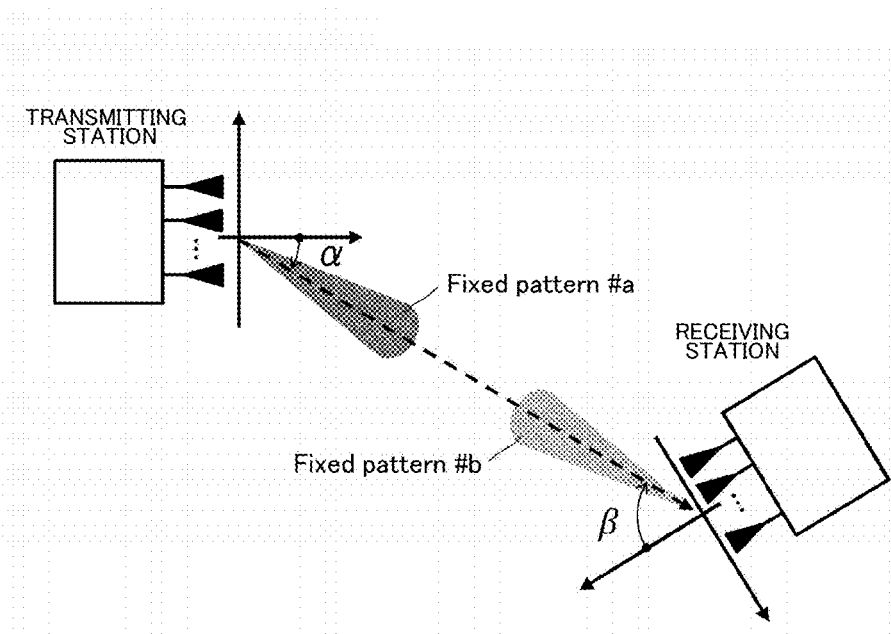
FIG. 17 is a diagram illustrating an example of placements of the transmitting station and the receiving station (a second example).

FIG. 17 illustrates an example of the placements of the transmitting station and the receiving station according to a second example. Note that both the transmitting station and the receiving station have the configuration of the communication device 200 illustrated in FIG. 2.

In the first example, the transmitting station and the receiving station independently estimate the transmission direction and the reception direction, respectively, in the Data Transmission phase, on the basis of the results of estimating the arrival directions of the received signals, and then determine the SWE parameters.

In contrast, the second example assumes that the transmitting station and the receiving station can hold a plurality of pre-determined Steering Vectors (also called "Fixed patterns" hereinafter) for estimating the arrival direction, such that a beam having a narrow directivity in a specific direction (called a "directional beam" hereinafter) is formed.

In the example illustrated in FIG. 17, when the transmitting station applies a Fixed pattern #a, a directional beam is formed in a direction α[rad], as seen from the transmitting station. Likewise, when the receiving station applies a Fixed pattern #b, a directional beam is formed in a direction β[rad], as seen from the receiving station. It is assumed that at this time, the direction of the directional beam formed is known by the transmitting station and the receiving station with respect to the Fixed patterns those stations hold.

For example, when the reception gain is estimated for each combination of Fixed patterns held by the transmitting station and the receiving station, and Fixed pattern #a on the transmitting station side and Fixed pattern #b on the receiving station side are chosen as the combination having the highest reception gain, the transmission direction of the transmitting station and the reception direction of the receiving station can be estimated. In the present specification, such a method of estimating the direction of the communication partner using the Fixed patterns held by the wireless communication terminals will be called the "beamformer method".

Figure 18:
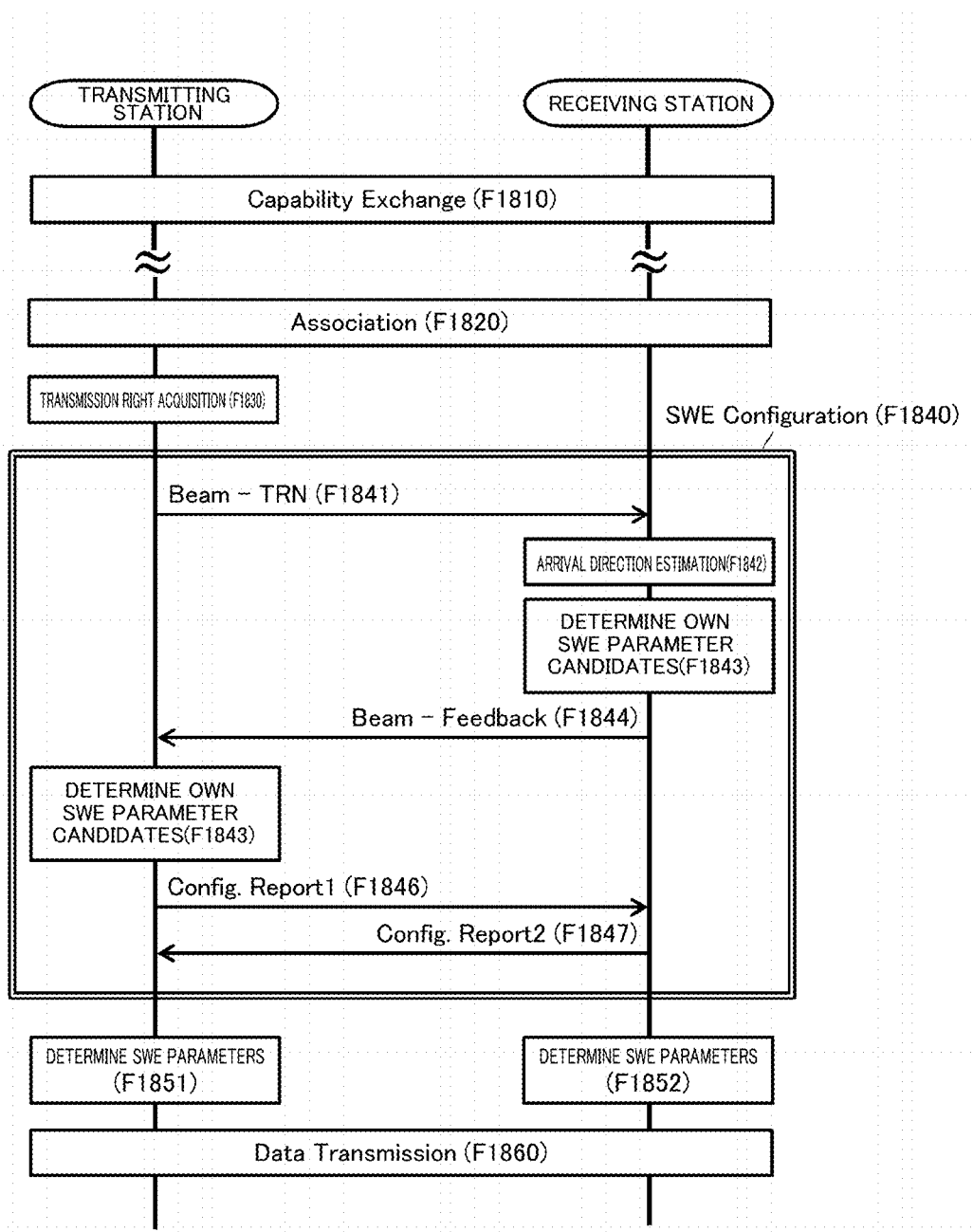
FIG. 18 is a diagram illustrating an example of a communication sequence performed between the transmitting station and the receiving station (the second example).

FIG. 18 illustrates an example of a communication sequence performed between the transmitting station and the receiving station in the second example. The "transmitting station" and "receiving station" referred to here are assumed to be one or the other of the base station and the terminal in the communication system illustrated in FIG. 1.

The communication sequence illustrated in FIG. 18 is constituted mainly by six phases: the exchange of capability information (Capability Exchange), Association, Transmission Right Acquisition, SWE Configuration, SWE Parameter Determination, and Data Transmission. However, the order in which the phases are implemented is not limited to the example illustrated in FIG. 18. For example, Capability Exchange may be performed after Association. The main features are in the signals transmitted and the operations of the transmitting station and the receiving station in each phase of the Capability Exchange and SWE Configuration, and this will be described in detail later.

The capability information exchange phase (F1810) is a phase in which the transmitting station and the receiving station exchange capability information pertaining to the functions which they can perform themselves. The capability information exchanged in the second example is different from that in the first example, but this will be described in detail later.

Association (F1820) is a phase that completes connection processing between the transmitting station and the receiving station, and is performed by one of the transmitting station and the receiving station making an Association response to an Association request from the other, according to, for example, IEEE 802.11.

Transmission Right Acquisition (F1830) is a phase in which the transmitting station forms an agreement to transmit with the receiving station. For example, the transmitting station may acquire the transmission right in accordance with CSMA/CA.

In the SWE Configuration phase (F1840), prior to the implementation of Data Transmission, the transmitting station and the receiving station each performs a series of operations to obtain information necessary for determining the SWE parameters (i.e., SWE Configuration).

Upon acquiring the transmission right in the Transmission Right Acquisition phase (F1830), the transmitting station transmits, to the receiving station, a Beam-TRN frame combining the Announcement and the TRN, which indicates the start of the SWE Configuration (F1841). For example, on the basis of the information exchanged in the capability information exchange phase, the transmitting station transmits this Beam-TRN frame to initiate the SWE Configuration when the frequency bandwidth where composite gain degradation can occur in at least one of the transmitting station or the receiving stations is used in a later Data Transmission phase. The Beam-TRN frame contains information indicating the frequency bandwidth and MCS that can be used in the later Data Transmission phase, but the details thereof will be described later.

Upon receiving the Beam-TRN frame, the receiving station estimates the arrival direction using the TRN of the Beam-TRN frame when the receiving station determines that the communication quality is affected by the composite gain degradation (F1842). Furthermore, the receiving station selects the receiving antennas in that receiving station itself, and determines the delay compensation amount as well as SWE parameter candidates such as the Steering Vector, the frequency bandwidth, and the like (F1843).

Then, the receiving station returns, to the transmitting station, a Beam-Feedback frame serving as a reception response to the Beam-TRN frame (F1844). The Beam-Feedback holds information that can specify the Fixed Pattern, which corresponds to the arrival direction of the signal transmitted from the receiving station to the transmitting station (described later). Accordingly, the transmitting station itself does not need to estimate the arrival direction, and thus the receiving station does not transmit the TRN. Additionally, the Beam-Feedback may contain information pertaining to some or all of the SWE parameters, such as the delay compensation amount, the Steering Vector, and the like determined by the receiving station.

Upon receiving the Beam-Feedback frame from the receiving station, the transmitting station specifies the Fixed Pattern corresponding to the arrival direction of the signal transmitted from the receiving station to the transmitting station, on the basis of the information that can specify the arrival direction held in that frame. Then, on the basis of the specified arrival direction and the information held in the Beam-Feedback frame, the transmitting station selects the transmitting antennas in that transmitting station itself, and determines the delay compensation amount as well as SWE parameter candidates such as the Steering Vector, the frequency bandwidth, and the like (F1845).

The transmitting station transmits the Config Report frame (Config Report 1) to the receiving station, including information for determining the SWE parameters (F1846). For example, information indicating the antennas to be used by the transmitting station and the receiving station, and the frequency bandwidth to be used in the later Data Transmission phase, may be included in Config Report 1.

Upon receiving Config Report 1 from the transmitting station, the receiving station transmits a Config Report frame (Config Report 2) to the transmitting station as a response (F1847). For example, if the receiving station can independently determine the antennas and SWE parameters of the transmitting station, the receiving station transmits information pertaining to the SWE parameters used by at least one of the transmitting station or the receiving station in the Data Transmission phase to the transmitting station in Config Report 2, on the basis of the received Config Report 1. Note that Config Report 2 does not necessarily need to be transmitted from the receiving station.

Next, the transmitting station determines the SWE parameters to be used in the Data Transmission phase on the basis of the SWE parameter candidates of the transmitting station itself determined in the SWE Configuration phase and Config Report 2 from the receiving station (F1851). Likewise, the receiving station determines the SWE parameters to be used in the Data Transmission phase on the basis of the SWE parameter candidates of the receiving station itself determined in the SWE Configuration phase and Config Report 1 from the receiving station (F1852).

Then, in the Data Transmission phase (F1860), the transmitting station and the receiving station each performs wireless communication using the SWE parameters determined on the basis of the information obtained in the SWE Configuration phase (F1840). However, the transmitting station and the receiving station do not have to use the antennas, Steering Vector, delay compensation amount, and frequency bandwidth determined through the SWE Configuration phase, and may, for example, perform wireless communication using values different from those in the SWE parameters for some periods of time. In the Data Transmission phase, for example, a data frame is transmitted from the transmitting station, and an Ack frame is returned from the receiving station in response in order to confirm the reception of the data frame, according to, for example, the IEEE 802.11 standard.

Note that the SWE Configuration does not have to be performed before the Data Transmission phase. In other words, the SWE Configuration may be omitted when it is determined that the communication quality will not be affected even if SWE parameters based on the SWE parameters determined in the previous SWE Configuration are used.

Likewise, one arrival direction estimation may be omitted, for one of the transmitting station and the receiving station, when it is determined that the communication quality will not be affected even if SWE parameters based on the SWE parameters determined in the previous SWE Configuration are used. In this case, the Beam-TRN or Beam-Feedback may contain information indicating that SWE parameters based on the SWE parameters determined in the previous SWE Configuration are used.

Figure 19:
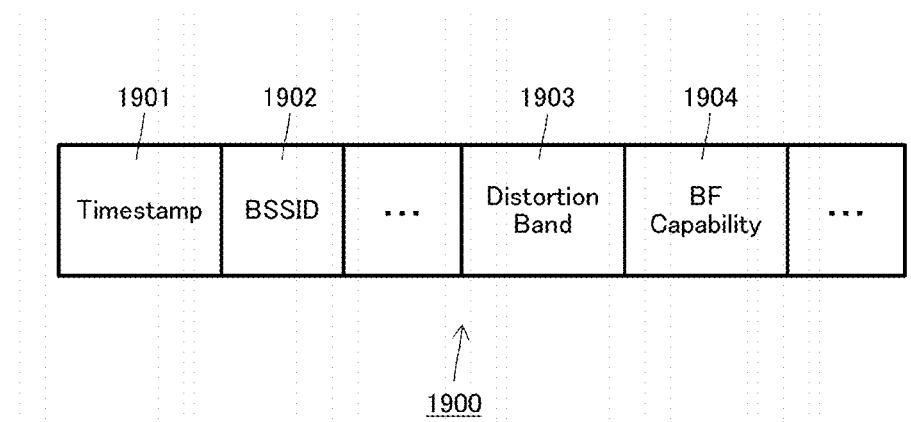
FIG. 19 is a diagram illustrating an example of the configuration of a capability information frame 1900 (the second example).

FIG. 19 illustrates an example of the configuration of a capability information frame 1900 exchanged between the transmitting station and the receiving station in the capability information exchange phase (F1810).

A Timestamp field 1901 holds information for a wireless communication terminal that has received the capability information frame 1900 to synchronize its time with the wireless communication terminal that has transmitted the capability information frame 1900. A BSSID field 1902 holds information such as a BSSID, indicating the connection state of the wireless communication terminal that transmitted the capability information with other wireless communication terminals. A Distortion Band field 1903 holds information indicating a frequency bandwidth in which composite gain degradation can occur in the wireless communication terminal that transmitted the capability information frame 1900.

A BF Capability field, indicated by reference number 1904, holds information indicating whether or not the wireless communication terminal that transmits the capability information frame 1900 supports the "beamformer method", which estimates the direction of the communication partner using the Fixed pattern. For example, if the wireless communication terminal is capable of forming a fixed directional beam and the directional beam is known, the BF Capability field 1904 can be "1", but holds "0" otherwise.

Figure 20:
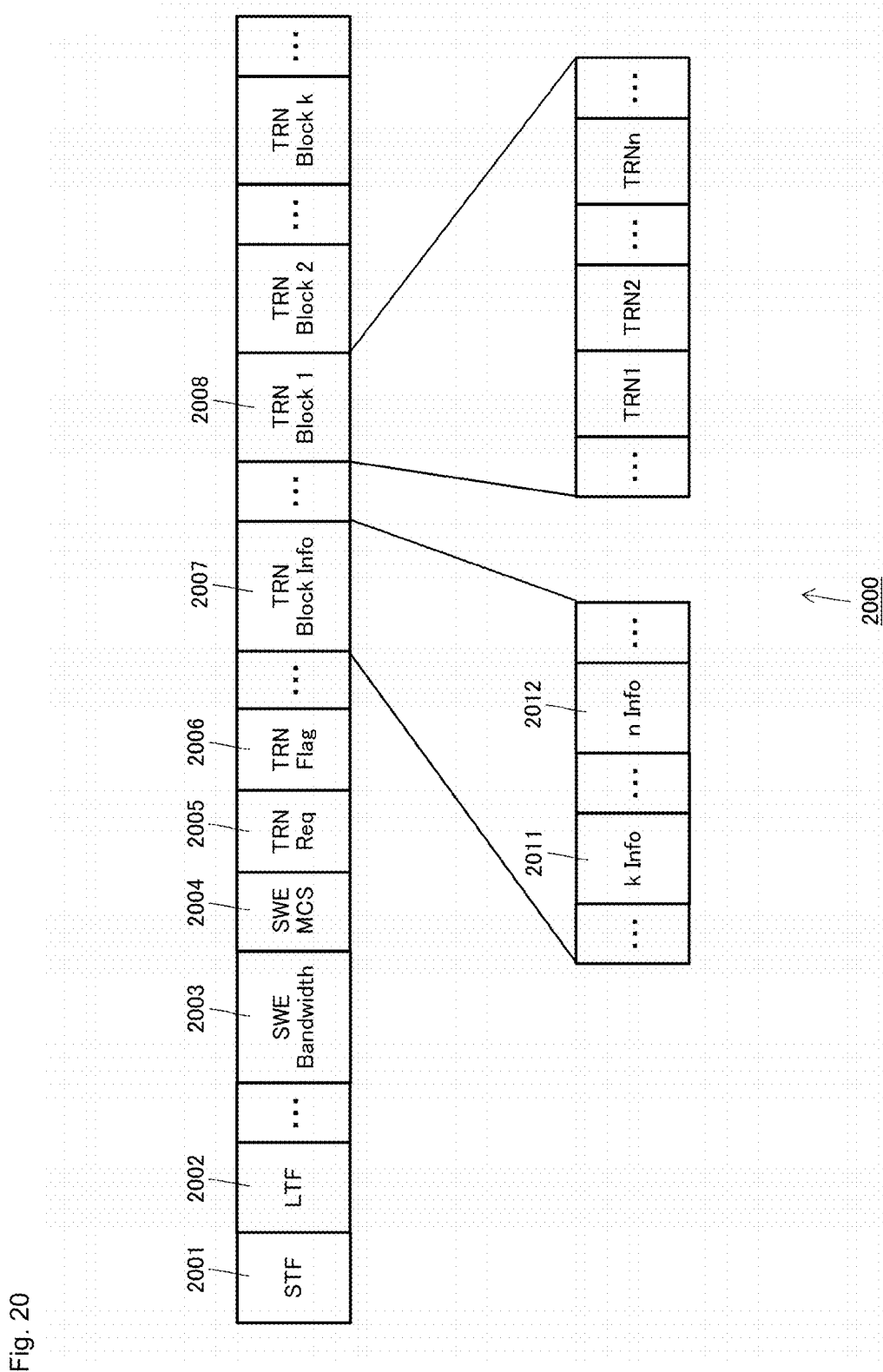
FIG. 20 is a diagram illustrating an example of the configuration of a Beam-TRN frame 2000.

FIG. 20 illustrates an example of the configuration of a Beam-TRN frame 2000 that combines the notification of the start of the SWE Configuration phase and the TRN into a single frame.

An STF field 2001 holds information used for time synchronization and frequency synchronization (e.g., a known short signal series). An LTF field 2002 holds information for estimating the received signal quality (e.g., a known long signal series). A SWE Bandwidth field 2003 holds information indicating a frequency bandwidth that can be used in the subsequent Data Transmission phase. A SWE MCS field 2004 holds information indicating an MCS that can be used in the subsequent Data Transmission phase. A TRN Req field 2005 holds information for determining whether a TRN should be transmitted when the wireless communication terminal that has received the Beam-TRN frame 2000 transmits a Feedback frame. A TRN Flag field 2006 holds information pertaining to the subsequent TRN.

A TRN Block Info field, indicated by reference number 2007, holds information pertaining to the subsequent (k) TRN Blocks and the TRNs in each TRN Block. In particular, the k Info fields 2011 in the TRN Block Info field 2007 hold information indicating the number of subsequent TRN Blocks, and the n Info fields 2012 hold information indicating the number of TRNs contained in each TRN Block field.

Each of the TRN Block fields constituted by a total of k TRN Block 1, TRN Block 2, . . . , TRN Block k, starting with TRN Block 1 indicated by reference number 2008, holds a TRN field consisting of a total of n TRN1, TRN2, . . . , TRNn.

The wireless communication terminal that transmits the Beam-TRN frame 2000 may use the same Fixed Pattern in each TRN Block when implementing the beamformer method. The TRN1 through TRNn in each of the k TRN Blocks may use Fixed Patterns different from each other when the wireless communication terminal that receives that Beam-TRN frame 2000 implements the beamformer method.

Specifically, the wireless communication terminal that transmits the Beam-TRN frame 2000 transmits k TRN Block 1, . . . , TRN Block k, using k Fixed pattern #1, . . . , Fixed pattern #k, in that order, respectively. n TRNs corresponding to the number of Fixed patterns used to receive TRNs in the wireless communication terminal that receives the Beam-TRN frame 2000 are held in each TRN Block. In such a case, based on the reception results for each TRN Block, the wireless communication terminal that transmits the Beam-TRN frame 2000 can determine which Fixed pattern is optimal for use in the transmission (in the example illustrated in FIG. 17, the transmitting station can determine Fixed pattern #a). Additionally, based on the reception results for each TRN in the TRN Block, the wireless communication terminal that receives the Beam-TRN frame 2000 can determine which Fixed pattern is optimal for use in the reception (in the example illustrated in FIG. 17, the receiving station can determine Fixed Pattern #b).

Each of the k TRN Blocks may hold information indicating the antenna and Fixed Pattern applied by the wireless communication terminal transmitting the Beam-TRN frame 2000, and the TRN contained in each TRN Block may hold information indicating which Fixed pattern the wireless communication terminal receiving the Beam-TRN frame should apply for the reception. In this case, the number of TRN Blocks, k, does not necessarily have to be the same as the total number of Fixed patterns on the transmitting side, and the number of TRNs contained in each TRN Block, n, does not have to be the same as the total number of fixed patterns on the receiving side. If the number of TRNs in each TRN Block is different, information indicating that fact or information pertaining to the number of TRNs in each TRN Block may be stored in the TRN Block may be held in the TRN Block Info field 2007 or in the individual TRN Block fields.

Figure 21:
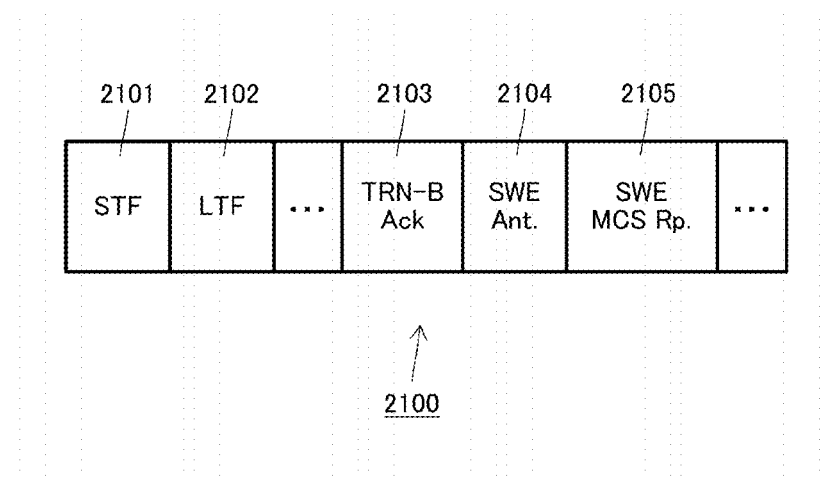
FIG. 21 is a diagram illustrating an example of the configuration of a Beam-Feedback frame 2100.

FIG. 21 illustrates an example of the configuration of a Beam-Feedback frame 2100, which is used as feedback for the Beam-TRN frame 2000 in the SWE Configuration phase.

An STF field 2101 holds information used for time synchronization and frequency synchronization (e.g., a known short signal series). An LTF field 2102 holds information for estimating the received signal quality (e.g., a known long signal series).

A SWE Ant. field 2104 includes information pertaining to the antenna used in the Data Transmission phase by the wireless communication terminal (the receiving station) that transmitted the SWE Ack frame. A SWE MCS Rp. field 2105 includes information for determining the MCS used in the subsequent Data Transmission phase.

A TRN-B Ack field, indicated by reference number 2103, holds information indicating that the frame 2100 is the Beam-Feedback frame 2100, which is a reception response to a Beam-TRN frame, and information pertaining to the arrival direction estimation result from the Beam-TRN frame transmitted immediately before. For example, information indicating the combination of Fixed patterns that had the highest reception gain through the beamformer method, the antennas used, and the like may be stored in that field 2103. Note that the reception response and the notification of the estimation result may be divided and transmitted in different frames.

Specifically, when k TRN Block 1, . . . , TRN Block k are transmitted in the Beam-TRN frame 2000 using k Fixed pattern #1, . . . , Fixed pattern #k in order, respectively, the TRN-B Ack field 2103 may hold the reception results of all TRN Blocks, or may hold only the reception results of a predetermined number of TRN Blocks having good reception results. The wireless communication terminal (transmitting station) that received the Beam-Feedback frame 2100 knows the correspondence relationship between the TRN Block and the station's own Fixed Pattern, and can therefore determine which Fixed pattern is optimal for use in the transmission (in the example illustrated in FIG. 17, the transmitting station can determine Fixed pattern #a).

The wireless communication terminal (transmitting station) that received the Beam-Feedback frame 2100 may determine the SWE parameter candidates on the basis of the information held in the TRN-B Ack field 2103. For example, if the TRN-B Ack field 2103 holds information indicating the Fixed pattern of the transmitting station that had a high gain at the receiving station as a result of the beamformer method, the transmitting station may use that Fixed pattern as the Steering Vector of the SWE parameters.

According to the second example, through the SWE Configuration phase, the transmitting station and the receiving station appropriately determine both the delay compensation amount set in the delay compensation unit 221 and the Steering Vector set in the phase shift unit 219, for composite gain degradation in an array antenna caused by path length differences. Accordingly, composite gain degradation compensation can be implemented without compensating for a delay amount in all of the antennas.

Additionally, according to the second example, the transmitting station and the receiving station can efficiently estimate each other's optimal arrival directions on the basis of the beamformer method.

Example 31

Figure 22:
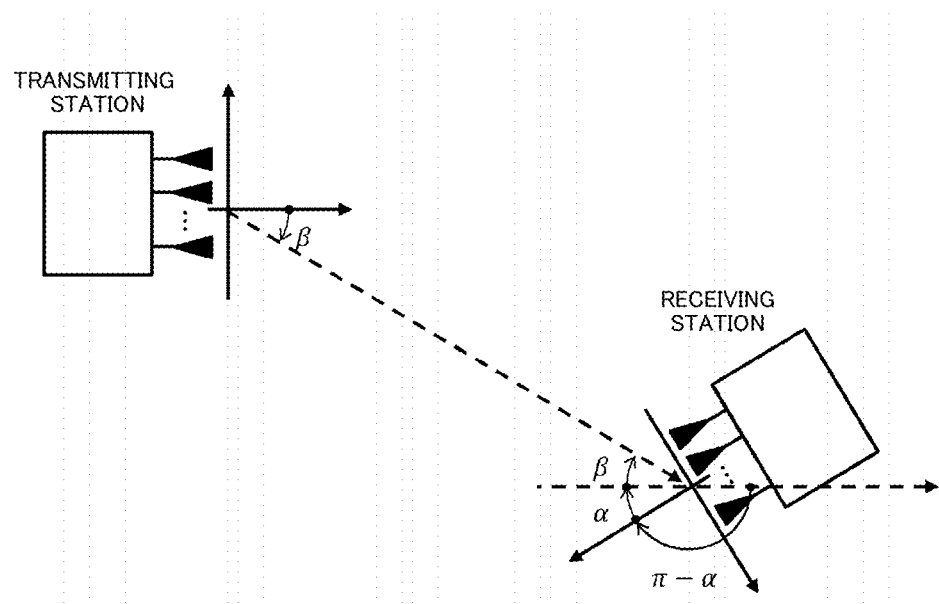
FIG. 22 is a diagram illustrating an example of placements of the transmitting station and the receiving station (a third example).

FIG. 22 illustrates an example of the placements of the transmitting station and the receiving station according to a third example. Note that both the transmitting station and the receiving station have the configuration of the communication device 200 illustrated in FIG. 2.

In the second example, the SWE parameters are determined by estimating the arrival direction through the "beamformer method", using a plurality of Fixed patterns held in the transmitting station and the receiving station for estimating the arrival direction. In contrast, the third example assumes that a rotation amount $\pi-\alpha$[rad] of the receiving station relative to the transmitting station can be obtained using external information such as from sensors, or is determined in advance.

In the example illustrated in FIG. 22, when estimating that the signal from an arrival direction $(\alpha+\beta)$[rad] is optimal, the receiving station obtains the rotation amount $\pi-\alpha$[rad] using a sensor or the like, calculates an optimal transmission direction $\beta$ of the transmitting station, and feeds $\beta$ back to the transmitting station. This makes it possible for both the transmitting station and the receiving station to determine the SWE parameters.

Figure 23:
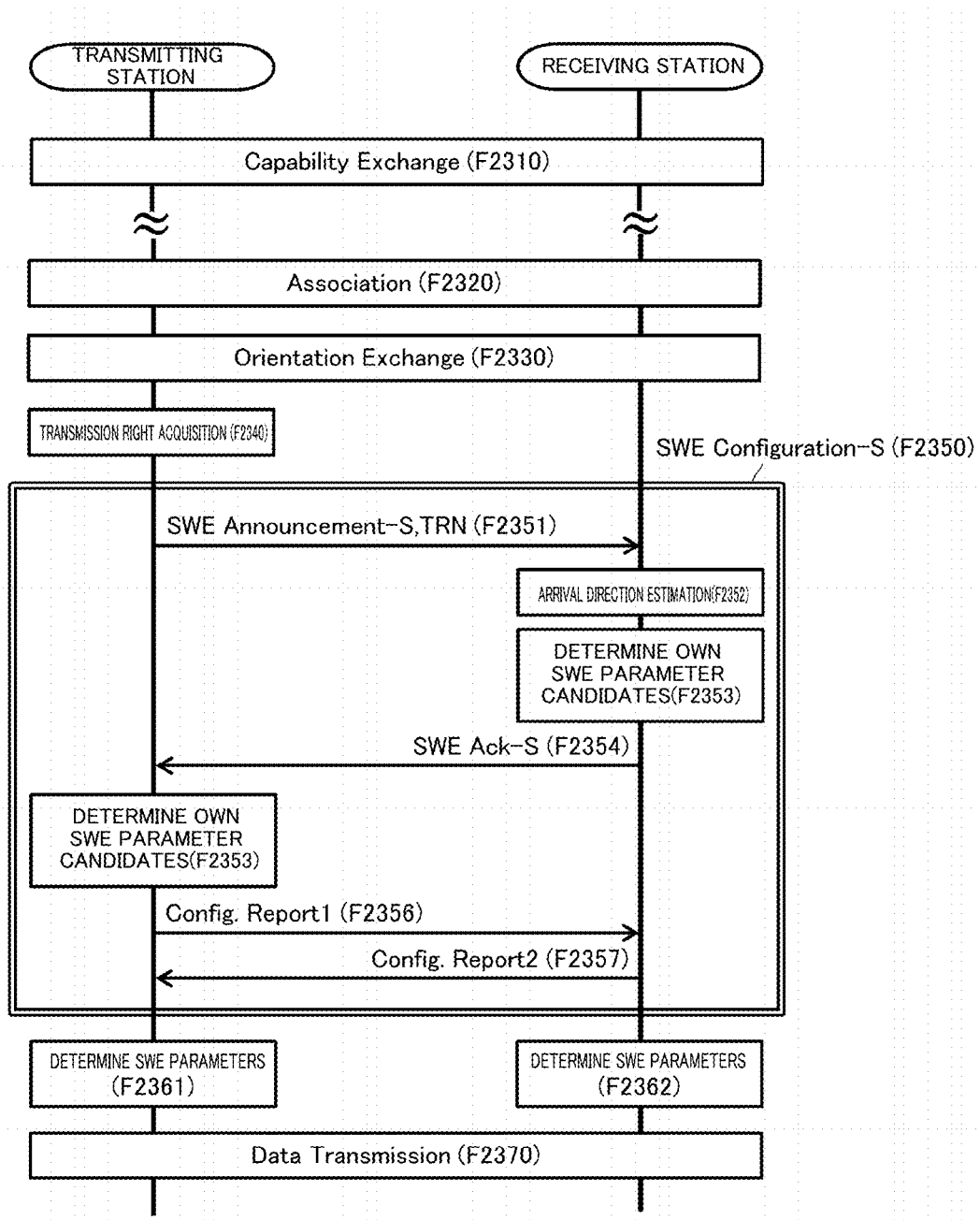
FIG. 23 is a diagram illustrating an example of a communication sequence performed between the transmitting station and the receiving station (the third example).

FIG. 23 illustrates an example of a communication sequence performed between the transmitting station and the receiving station in the third example. The "transmitting station" and "receiving station" referred to here are assumed to be one or the other of the base station and the terminal in the communication system illustrated in FIG. 1.

The communication sequence illustrated in FIG. 23 is constituted mainly by seven phases: the exchange of capability information (Capability Exchange), Association, Transmission Right Acquisition, Orientatoin Exchange, SWE Configuration, SWE Parameter Determination, and Data Transmission. The exchange of capability information, the signals transmitted in each phase of SWE Configuration, and the operations of the transmitting station and the receiving stations are different from those in the first example, and the Orientatoin Exchange phase is also included. However, details of this will be given later.

The capability information exchange phase (F2310) is a phase in which the transmitting station and the receiving station exchange capability information pertaining to the functions which they can perform themselves. Additionally, Association (F2320) is a phase that completes connection processing between the transmitting station and the receiving station, and is performed by one of the transmitting station and the receiving station making an Association response to an Association request from the other, according to, for example, IEEE 802.11.

Orientation Exchange (F2330) is a phase in which the transmitting station and the receiving station exchange information pertaining to each other's rotation amounts (Orientations) when those stations can obtain their own rotation amounts $\beta$ and $\alpha$ using external information from sensors or the like. Orientation frames are used to exchange Orientations, and this will be described in detail later.

Transmission Right Acquisition (F2340) is a phase in which the transmitting station forms an agreement to transmit with the receiving station. For example, the transmitting station may acquire the transmission right in accordance with CSMA/CA.

In the SWE Configuration phase (F2350), prior to the implementation of Data Transmission, the transmitting station and the receiving station each performs a series of operations to obtain information necessary for determining the SWE parameters (i.e., SWE Configuration).

Upon acquiring the transmission right in the Transmission Right Acquisition phase (F2340), the transmitting station notifies the receiving station of the start of the SWE Configuration phase (F2350) by transmitting a SWE Announcement-S frame (F2351). For example, on the basis of the information exchanged in the capability information exchange phase, the transmitting station transmits a SWE Announcement-S frame to initiate the SWE Configuration when the frequency bandwidth where composite gain degradation can occur in at least one of the transmitting station or the receiving stations is used in a later Data Transmission phase. The SWE Announcement-S frame contains information indicating the frequency bandwidth and MCS that can be used in the later Data Transmission phase, but the details thereof will be described later. The transmitting station transmits the TRN frame following the SWE Announcement-S frame.

Upon receiving the SWE Announcement-S frame, the receiving station estimates the arrival direction using the TRN that follows the SWE Announcement-S frame when the receiving station determines that the communication quality is affected by the composite gain degradation (F2352). Furthermore, the receiving station selects the receiving antennas in that receiving station itself, and determines the delay compensation amount as well as SWE parameter candidates such as the Steering Vector, the frequency bandwidth, and the like (F2353).

After that, the receiving station returns a SWE Ack-S to the transmitting station as a reception response to the SWE Announcement-S frame and TRN (F2354). The SWE Ack-S frame holds information pertaining to the arrival direction of the signal transmitted from the receiving station to the transmitting station (or information with which the arrival direction can be calculated) (described later). Accordingly, the transmitting station itself does not need to estimate the arrival direction, and thus the receiving station does not transmit the TRN. The SWE Ack-S frame may contain information pertaining to some or all of the SWE parameters, such as the delay compensation amount, the Steering Vector, and the like determined by the receiving station.

Upon receiving the SWE Ack-S frame from the receiving station, the transmitting station specifies the arrival direction of the signal transmitted from the receiving station to the transmitting station, on the basis of the information pertaining to the arrival direction stored in that frame (or the information with which the arrival direction can be calculated). Then, on the basis of the specified arrival direction and the information held in the SWE Ack-S frame, the transmitting station selects the transmitting antennas in that transmitting station itself, and determines the delay compensation amount as well as SWE parameter candidates such as the Steering Vector, the frequency bandwidth, and the like (F2355).

The transmitting station transmits the Config Report frame (Config Report 1) to the receiving station, including information for determining the SWE parameters (F2356). Additionally, upon receiving Config Report 1 from the transmitting station, the receiving station transmits a Config Report frame (Config Report 2) to the transmitting station as a response (F2357). Note that Config Report 2 does not necessarily need to be transmitted from the receiving station.

Next, the transmitting station determines the SWE parameters to be used in the Data Transmission phase on the basis of the SWE parameter candidates of the transmitting station itself determined in the SWE Configuration phase and Config Report 2 from the receiving station (F2361). Likewise, the receiving station determines the SWE parameters to be used in the Data Transmission phase on the basis of the SWE parameter candidates of the receiving station itself determined in the SWE Configuration phase and Config Report 1 from the receiving station (F2362).

Then, in the Data Transmission phase (F2370), the transmitting station and the receiving station each performs wireless communication using the SWE parameters determined on the basis of the information obtained in the SWE Configuration phase (F2350). However, the transmitting station and the receiving station do not have to use the antennas, Steering Vector, delay compensation amount, and frequency bandwidth determined through the SWE Configuration phase, and may, for example, perform wireless communication using values different from those in the SWE parameters for some periods of time. In the Data Transmission phase, for example, a data frame is transmitted from the transmitting station, and an Ack frame is returned from the receiving station in response in order to confirm the reception of the data frame, according to, for example, the IEEE 802.11 standard.

Note that the SWE Configuration does not have to be performed before the Data Transmission phase. In other words, the SWE Configuration may be omitted when it is determined that the communication quality will not be affected even if SWE parameters based on the SWE parameters determined in the previous SWE Configuration are used.

Likewise, one arrival direction estimation may be omitted, for one of the transmitting station and the receiving station, when it is determined that the communication quality will not be affected even if SWE parameters based on the SWE parameters determined in the previous SWE Configuration are used. In this case, the SWE Announcement-S or SWE Ack-S may contain information indicating that SWE parameters based on the SWE parameters determined in the previous SWE Configuration are used.

Figure 24:
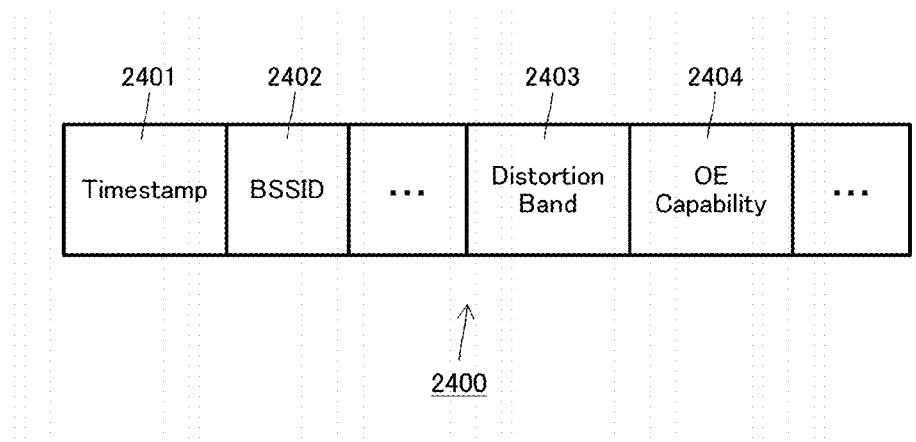
FIG. 24 is a diagram illustrating an example of the configuration of a capability information frame 2400 (the third example).

FIG. 24 illustrates an example of the configuration of a capability information frame 2400 exchanged between the transmitting station and the receiving station in the capability information exchange phase (F2310).

A Timestamp field 2401 holds information for a wireless communication terminal that has received the capability information frame 2400 to synchronize its time with the wireless communication terminal that has transmitted the capability information frame 2400. A BSSID field 2402 holds information such as a BSSID, indicating the connection state of the wireless communication terminal that transmitted the capability information with other wireless communication terminals. A Distortion Band field 2403 holds information indicating a frequency bandwidth in which composite gain degradation can occur in the wireless communication terminal that transmitted the capability information frame 2400.

An OE Capability field, indicated by reference number 2404, holds information indicating that the wireless communication terminal transmitting the capability information frame 2400 is capable of implementing the SWE Configuration-S.

Figure 25:
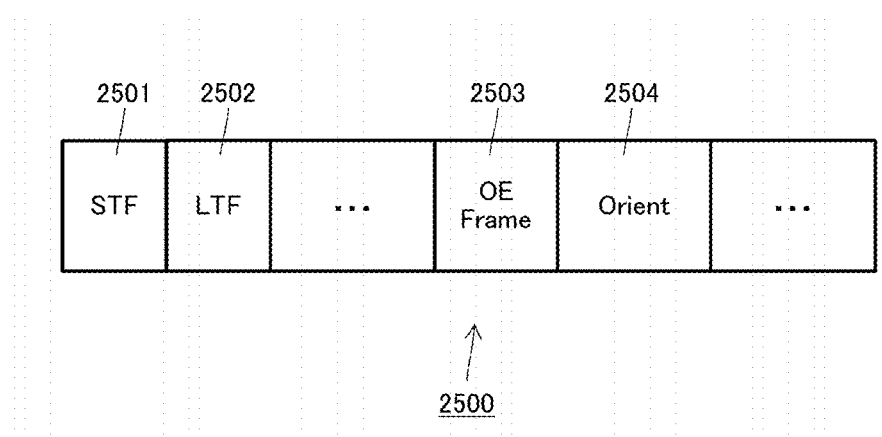
FIG. 25 is a diagram illustrating an example of the configuration of an Orientation frame 2500.

FIG. 25 illustrates an example of the configuration of an Orientation frame 2500 exchanged between the transmitting station and the receiving station in the Orientation Exchange phase.

STF and LTF fields, indicated by reference numbers 2501 and 2502, respectively, are the same as the fields with the same names in the frames described above and will therefore not be described here.

An OE Frame field, indicated by reference number 2503, holds information indicating that the frame 2500 is an Orientation frame.

An Orient field, indicated by reference number 2504, holds information indicating the bearing in which the wireless communication terminal transmitting the Orientation frame 2500 is installed. For example, if the transmitting station and the receiving station are installed in a fixed manner, information indicating the bearing of the forward direction of the wireless communication terminal transmitting the Orientation Exchange may be held in the Orient field 2504. When the bearing of the forward direction is determined using external information from a sensor terminal or the like, the information may be held in the Orient field 2504 to determine the bearing.

In the example illustrated in FIG. 22, the bearing of the forward direction of the transmitting station relative to a predetermined direction is 0, and the bearing of the forward direction of the receiving station relative to the predetermined direction is $\pi-\alpha$. In the Orientation Exchange phase 2330, the transmitting station and the receiving station can recognize each other's bearings 0 and $\pi-\alpha$ by exchanging Orientation frames 2300.

The SWE Announcement frame 900 and the TRN frame 1000 of the first example may be used for the SWE Announcement-S frame and TRN. Additionally, the SWE Announcement frame and the TRN frame may be used together as a single frame 1100. Detailed descriptions of the frame will not be given here.

Figure 26:
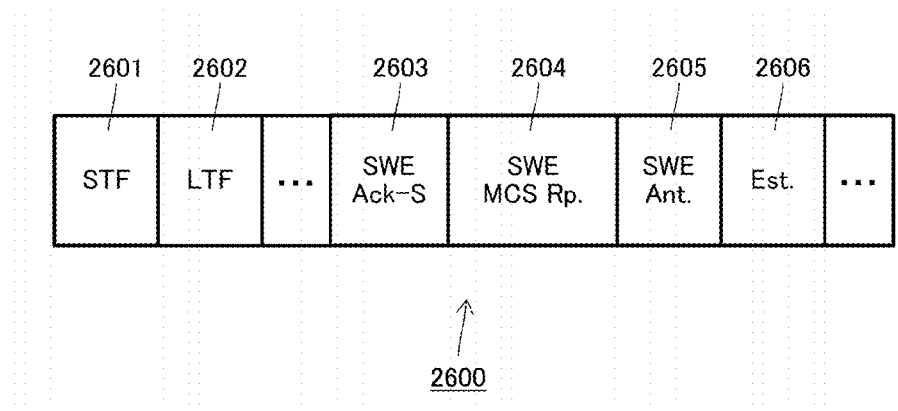
FIG. 26 is a diagram illustrating an example of the configuration of a SWE Ack-S frame 2600.

FIG. 26 illustrates an example of the configuration of a SWE Ack-S frame 2600, which is used as a confirmation response to the SWE Announcement-S frame in the SWE Configuration-S phase.

STF and LTF fields, indicated by reference numbers 2601 and 2602, respectively, are the same as the fields with the same names in the frames described above and will therefore not be described here.

A SWE Ack-S field, indicated by reference number 2603, includes information indicating that the frame 2600 is a SWE Ack-S frame. This SWE Ack-S field may hold information indicating that the SWE Announcement-S frame has been received correctly, for example.

A SWE MCS Rp. field, indicated by reference number 2604, includes information for determining the MCS used in the subsequent Data Transmission phase. For example, information indicating a composite gain degradation amount, an SNR, and so on when receiving a wireless signal according to the arrival direction estimated by the receiving station may be included.

A SWE Ant. field, indicated by reference number 2605, includes information pertaining to the antenna used in the Data Transmission phase by the wireless communication terminal (the receiving station) that transmitted the SWE Ack frame. For example, information indicating the number of antennas used by the receiving station in the Data Transmission phase, as well as candidates for the Steering Vector, the delay compensation amount, and the frequency bandwidth, may be held in the SWE Ant. field 2605. A SWE Ant. field 2605 may be information determined on the basis of the reception result of at least one of the SWE Announcement frame, the TRN frame, of a frame combining the SWE Announcement and the TRN into a single frame, received by the receiving station immediately previous.

An Est. field, indicated by reference number 2606, holds information pertaining to a result of the receiving station estimating the arrival direction using the SWE Announcement-S frame or the TRN frame.

The third example differs from the first example in that the arrival direction is not estimated on the basis of SWE Ack-S on the transmitting station side. Instead, on the basis of the information pertaining to the arrival direction written in the Est. field in the SWE Ack-S frame returned from the receiving station, candidates for the SWE parameters in the transmitting station are determined.

In the example illustrated in FIG. 22, the bearing of the forward direction of the transmitting station relative to a predetermined direction is 0, and the bearing of the forward direction of the receiving station relative to the predetermined direction is $\pi-\alpha$. In the Orientation Exchange phase 2330, the transmitting station and the receiving station can recognize each other's bearings 0 and $\pi-\alpha$ by exchanging Orientation frames 2300.

Additionally, the receiving station estimates the arrival direction on the basis of the TRN from the transmitting station in the SWE Configuration-S phase. In the example illustrated in FIG. 22, upon estimating that a signal from the arrival direction of $(\alpha+\beta)$[rad] relative to the current forward direction is optimal, the receiving station calculates an optimal transmission direction $\beta$ of the transmitting station from the rotation amount $\pi-\alpha$[rad] of the receiving station itself, obtained from a sensor or the like, stores the transmission direction in the Est. field of the SWE-Ack-S frame, and feeds the frame back to the transmitting station. In this case, the transmitting station does not estimate the arrival direction itself, but can obtain the arrival direction $\beta$ from the Est. field of the SWE Ack-S frame from the receiving station. Alternatively, the receiving station may hold the information on the optimal arrival direction $(\alpha+\beta)$[rad] in the Est. field of the SWE Ack-S frame and feed that information back to the transmitting station. In this case, the transmitting station can calculate its own optimal transmission direction $\beta$ on the basis of the rotation amount $\pi-\alpha$[rad] of the receiving station, obtained in the Orientation Exchange phase, and the information of the arrival direction $(\alpha+\beta)$ [rad], fed back from the receiving station. In either case, the transmitting station does not need to estimate the arrival direction from the TRN, and thus the receiving station does not transmit the TRN. As a result, the transmitting station and the receiving station can determine the SWE parameters on the basis of the respective obtained arrival directions.

According to the third example, through the SWE Configuration phase, the transmitting station and the receiving station appropriately determine both the delay compensation amount set in the delay compensation unit 221 and the Steering Vector set in the phase shift unit 219, for composite gain degradation in an array antenna caused by path length differences. Accordingly, composite gain degradation compensation can be implemented without compensating for a delay amount in all of the antennas.

Additionally, according to the third example, the transmitting station and the receiving station can each obtain their own rotation amounts, and can efficiently estimate each other's optimal arrival direction by exchanging each other's rotation amounts in advance.

INDUSTRIAL APPLICABILITY

The technique disclosed in the present specification has been described in detail with reference to specific embodiments. However, it will be apparent to those skilled in the art that modifications, substitutions, and the like can be made in the embodiments without departing from the essential spirit of the technique disclosed in the present specification.

The technique disclosed in the present specification can be favorably applied, for example, to data transmission between a transmitting station and a receiving station using a high frequency band such as the millimeter-wave band. Of course, the technique disclosed in the present specification can be similarly applied to communication systems that use frequency bands other than high frequency bands. Additionally, the technique disclosed in the present specification can also be applied in, for example, communication systems using the IEEE 802.11 standard, but can of course be similarly applied in other various types of communication systems.

In sum, the technique disclosed in the present specification has been described in the form of examples, and the content of the present specification is not intended to be interpreted as being limiting. The essential spirit of the technique disclosed in the present specification should be determined in consideration of the claims.

The technique disclosed in the present specification can also take on the configurations described below.

(1) A communication device, comprising: a communication unit that transmits and receives a wireless signal using a plurality of antenna elements; and a control unit that controls compensation for degradation in communication quality in the communication unit on the basis of control information received from outside.

(2) The communication device according to the foregoing (1), wherein the communication unit includes a plurality of wireless interfaces and a delay compensation unit that compensates for delay of the wireless interfaces.

(3) The communication device according to the foregoing (1) or (2), wherein the control unit determines whether or not to perform the compensation on the basis of capability information exchanged with a communication partner.

(4) The communication device according to any one of the foregoing (1) to (3), wherein the control information includes at least one of information pertaining to an antenna element used during data transmission with a communication partner and information pertaining to an arrival direction in which a receiving station of a data frame can receive.

(5) The communication device according to any one of the foregoing (2) to (4), wherein the control unit determines a compensation parameter including at least one of an antenna element, a frequency bandwidth, a phase adjustment amount of the wireless interfaces, and a delay compensation amount used in wireless communication with a communication partner, on the basis of the control information received from the communication partner.

(6) The communication device according to the foregoing (5), wherein the control unit determines candidates for the compensation parameter on the basis of an arrival direction of a signal from the communication partner, and determines the compensation parameter from among the candidates on the basis of the control information.

(7) The communication device according to the foregoing (6), wherein the control unit estimates the arrival direction on the basis of a reference signal received from the communication partner.

(8) The communication device according to the foregoing (6), wherein the communication unit is capable of transmitting and receiving the wireless signal by selecting a plurality of directional beams determined in advance, and the control unit estimates the arrival direction on the basis of a reference signal sent from the communication partner for each of the directional beams, and notifies the communication partner of information pertaining to a result of receiving each reference signal for each of the directional beams.

(9) The communication device according to the foregoing (6), wherein the communication unit is capable of transmitting and receiving the wireless signal by using and selecting a plurality of directional beams determined in advance, and the control unit estimates an arrival direction of a signal from the communication partner on the basis of a notification pertaining to a result of receiving each of reference signals from the communication partner transmitted for each of the directional beams.

(10) The communication device according to the foregoing (6), wherein the communication device is capable of obtaining its own bearing, and exchanges capability information with the communication partner, the capability information including information pertaining to each other's bearings, and the control unit estimates the arrival direction on the basis of a reference signal received from the communication partner, and notifies the communication partner of information pertaining to the arrival direction on the basis of the bearing of the communication partner.

(11) The communication device according to the foregoing (6), wherein the communication device is capable of obtaining its own bearing, and exchanges capability information with the communication partner, the capability information including information pertaining to each other's bearings, and the control unit estimates an arrival direction of a signal from the communication partner on the basis of a notification pertaining to the arrival direction from the communication partner in response to the reference signal transmitted.

(12) A communication method performed by a communication device that transmits and receives a wireless signal using a plurality of antenna elements, the method comprising: receiving control information from outside; and controlling compensation for degradation in communication quality in the communication unit on the basis of control information received from outside.

(13) The communication method according to the foregoing (12), wherein the communication device includes a plurality of wireless interfaces and a delay compensation unit that compensates for delay of the wireless interfaces.

(14) The communication method according to the foregoing (12) or (13), wherein in the controlling, it is determined whether or not to perform the compensation on the basis of capability information exchanged with a communication partner.

(15) The communication method according to any one of the foregoing (12) to (14), wherein the control information includes at least one of information pertaining to an antenna element used during data transmission with a communication partner and information pertaining to an arrival direction in which a receiving station of a data frame can receive.

(16) The communication method according to any one of the foregoing (13) to (15), wherein in the controlling, a compensation parameter including at least one of an antenna element, a frequency bandwidth, a phase adjustment amount of the wireless interfaces, and a delay compensation amount used in wireless communication with a communication partner is determined on the basis of the control information received from the communication partner.

(17) The communication method according to the foregoing (16), wherein in the controlling, candidates for the compensation parameter are determined on the basis of an arrival direction of a signal from the communication partner, and the compensation parameter is determined from among the candidates on the basis of the control information.

(18) The communication method according to the foregoing (17), further comprising receiving a reference signal from the communication partner, wherein in the controlling, the arrival direction is estimated on the basis of the reference signal received.

(19) The communication method according to the foregoing (17), wherein the communication device is capable of transmitting and receiving the wireless signal by selecting a plurality of directional beams determined in advance, the method further includes receiving a reference signal sent from the communication partner for each of the directional beams, and in the controlling, the arrival direction is estimated on the basis of the reference signal sent for each of the directional beams, and the communication partner is notified of information pertaining to a result of receiving each reference signal for each of the directional beams.

(20) The communication method according to the foregoing (17), wherein the communication device is capable of transmitting and receiving the wireless signal by using and selecting a plurality of directional beams determined in advance, the method further comprises transmitting a reference signal for each of the directional beams, and in the controlling, an arrival direction of a signal from the communication partner is estimated on the basis of a notification pertaining to a result of receiving each of reference signals from the communication partner transmitted for each of the directional beams.

(21) The communication method according to the foregoing (17), wherein the communication device is capable of obtaining its own bearing, and exchanges capability information with the communication partner, the capability information including information pertaining to each other's bearings, the method further comprises receiving a reference signal from the communication partner, and in the controlling, the arrival direction is estimated on the basis of the reference signal received, and the communication partner is notified of information pertaining to the arrival direction on the basis of the bearing of the communication partner.

(22) The communication method according to the foregoing (17), wherein the communication device is capable of obtaining its own bearing, and exchanges capability information with the communication partner, the capability information including information pertaining to each other's bearings, the method further comprises transmitting a reference signal, and in the controlling, an arrival direction of a signal from the communication partner is estimated on the basis of a notification pertaining to the arrival direction from the communication partner in response to the reference signal transmitted.

REFERENCE SIGNS LIST

200 Communication device
201 Control unit
202 Power source unit
203 Communication unit
204 Antenna unit
211 Data processing unit
212 Wireless control unit
213 Modulation/demodulation unit
214 Transmitted signal processing unit
215 Received signal processing unit
216 Channel estimation unit
217 Wireless interface unit
218 Amplifier unit
219 Phase shift unit
220 Switch unit
221 Delay compensation unit

The invention claimed is:

1. A communication device, comprising:
a plurality of wireless interfaces;
a plurality of antenna elements connected to the plurality of wireless interfaces; and
circuitry configured to:
  transmit, via the plurality of antenna elements, a wireless signal to a communication partner;
  receive, via the plurality of antenna elements, the wireless signal from the communication partner;
  estimate an arrival direction of the received wireless signal;
  determine a plurality of compensation parameter candidates based on the estimated arrival direction, wherein each of the plurality of compensation parameter candidates includes:
    at least one of the plurality of antenna elements;
    a frequency bandwidth;
    a phase adjustment amount of at least one of the plurality of wireless interfaces; and
    a delay compensation amount;
  receive control information from the communication partner;
  determine a specific compensation parameter from the plurality of compensation parameter candidates based on the control information; and
  control, based on the specific compensation parameter, compensation for degradation in communication quality.

2. The communication device according to claim 1, wherein the circuitry is further configured to:
exchange capability information with the communication partner; and
determine the compensation based on the exchanged capability information.

3. The communication device according to claim 1, wherein the control information includes at least one of information related to the at least one of the plurality of antenna elements for data transmission with the communication partner and information related to the arrival direction.

4. The communication device according to claim 1, wherein the circuitry is further configured to:
receive a reference signal from the communication partner; and
estimate the arrival direction based on the received reference signal.

5. The communication device according to claim 1, wherein the circuitry is further configured to:
select a plurality of specific directional beams;
transmit and receive the wireless signal based on the selection of the plurality of specific directional beams;
receive, from the communication partner, a reference signal for each of the plurality of specific directional beams;
estimate the arrival direction based on the received reference signal for each of the plurality of specific directional beams; and
notify, to the communication partner, information related to the received reference signal for each of the plurality of specific directional beams.

6. The communication device according to claim 1, wherein the circuitry is further configured to:
select a plurality of specific directional beams;
transmit and receive the wireless signal based on the selection of the plurality of specific directional beams;
transmit a reference signal for each of the plurality of specific directional beams to the communication partner;
receive, from the communication partner, a notification related to the transmission of the reference signal for each of the plurality of specific directional beams; and
estimate the arrival direction based on the received notification.

7. The communication device according to claim 1, wherein the circuitry is further configured to:
obtain a first bearing;
exchange bearing information with the communication partner, wherein
  the bearing information is associated with the first bearing and a second bearing, and
  the first bearing is associated with the transmission of the wireless signal and the second bearing is associated with the reception of the wireless signal;
receive a reference signal from the communication partner;
estimate the arrival direction based on the received reference signal; and
notify, to the communication partner, information related to the arrival direction based on the second bearing.

8. The communication device according to claim 1, wherein the circuitry is further configured to:
obtain a first bearing;
exchange bearing information with the communication partner, wherein
  the bearing information is associated with the first bearing and a second bearing, and
  the first bearing is associated with the transmission of the wireless signal and the second bearing is associated with the reception of the wireless signal;

transmit a reference signal to the communication partner;
receive, from the communication partner, a notification of information related to the arrival direction based on the transmission of the reference signal; and
estimate the arrival direction based on the received notification.

9. A communication method, comprising:
transmitting, via a plurality of antenna elements, a wireless signal to a communication partner;
receiving, via the plurality of antenna elements, the wireless signal from the communication partner
estimating an arrival direction of the received wireless signal;
determining a plurality of compensation parameter candidates based on the estimated arrival direction, wherein each of the plurality of compensation parameter candidates includes:
at least one of the plurality of antenna elements;
a frequency bandwidth;
a phase adjustment amount of at least one of a plurality of wireless interfaces; and
a delay compensation amount;
receiving control information from the communication partner;
determining a specific compensation parameter from the plurality of compensation parameter candidates based on the control information; and
controlling, based on the specific compensation parameter, compensation for degradation in communication quality.

* * * * *